(12) United States Patent
Ikeno et al.

(10) Patent No.: US 7,645,974 B2
(45) Date of Patent: Jan. 12, 2010

(54) METHOD AND APPARATUS FOR DISTANCE MEASUREMENT

(75) Inventors: Ryohei Ikeno, Tokyo (JP); Tadashi Kawata, Tokyo (JP); Fumio Kubo, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 92 days.

(21) Appl. No.: 12/057,370

(22) Filed: Mar. 27, 2008

(65) Prior Publication Data
US 2008/0237445 A1   Oct. 2, 2008

(30) Foreign Application Priority Data
Mar. 27, 2007   (JP) ............... 2007-081763

(51) Int. Cl.
*G01J 1/32*   (2006.01)
*G01C 3/08*   (2006.01)
(52) U.S. Cl. ............... 250/205; 250/559.38; 356/5.09
(58) Field of Classification Search ............. 250/205, 250/206.1, 559.38; 356/4.01, 4.07, 5.01, 356/5.09
See application file for complete search history.

(56) References Cited

U.S. PATENT DOCUMENTS 7,119,350 B2   10/2006   Hashimoto et al.

2008/0205709 A1 *   8/2008   Masuda et al. ............. 382/106
2009/0122297 A1 *   5/2009   Ikeno et al. ............... 356/5.09

FOREIGN PATENT DOCUMENTS

| JP | 2000075030 | 3/2000 |
|----|------------|--------|
| JP | 2004032682 | 1/2004 |
| JP | 2005182137 | 7/2005 |

* cited by examiner

*Primary Examiner*—Kevin Pyo
(74) *Attorney, Agent, or Firm*—Cermak Kenealy Vaidya & Nakajima LLP

(57) ABSTRACT

The disclosed subject matter relates to a method and distance measurement apparatus for measuring a distance to an object, which can include a light source, a solid state camera, a controller and a distance data generator. The light source can be configured to emit a modulated light towards an object, and the solid state camera can convert the light reflected from the object into charges. The distance data generator can be configured to calculate the distance based on the charges, and the controller can be configured to adjust the modulated light to be more favorable under various circumstances. Thus, the method of the disclosed subject matter can accurately measure distance under various circumstances and can result in providing a distance measurement apparatus with a simple configuration and at low cost, and can be used as a sensor for distance measurement of an obstacle and the like in a vehicle, security system, robot, etc.

36 Claims, 15 Drawing Sheets

METHOD AND APPARATUS FOR DISTANCE MEASUREMENT

This application claims the priority benefit under 35 U.S.C. § 119 of Japanese Patent Application No. 2007-081763 filed on Mar. 27, 2007, which is hereby incorporated in its entirety by reference.

BACKGROUND

1. Field

The presently disclosed subject matter relates to a method for distance measurement and a distance measurement apparatus using the method for distance measurement. The distance measurement apparatus and method can be used whenever it is desired to measure a distance of a moving object with high accuracy and under various circumstances by emitting a modulated light towards the moving object. The disclosed subject matter is particularly suitable for use in a vehicle, a robot, security system and the like.

2. Description of the Related Art

A conventional method for distance measurement that can be employed in a vehicle and the like is disclosed, for example, in patent document No. 1 (Japanese Patent Application Laid Open JP2005-182137), patent document No. 2 (Japanese Patent Application Laid Open JP2000-75030), etc. The disclosed conventional methods include: emitting light using extremely high frequency (EHF) radar, a laser radar, etc., towards an object; detecting the reflex light that is dashed against the object; and calculating the distance by measuring a time from emitting the light to detecting the reflex light. The above disclosed conventional method is well known as "Time of Flight" (TOF) method.

However, when a laser light source is used as a light source in a distance measurement apparatus, a major driver is used to create an oscillation thereof. In addition, an output characteristic thereof should also be adjusted in order to prevent people that may be located in a direction of the distance measurement from being affected by the laser light source. Thus, the configuration including the major driver and the adjustor may result in a complicated distance measurement apparatus.

Therefore, another conventional method using the TOF method is disclosed, for example, in patent document No. 3 (Japanese Patent Application Laid Open JP2004-32682). According to this conventional method using the TOF method, a semiconductor light-emitting device such as an LED can be used as a light source and an image sensor including a plurality of photoelectric conversion chips can be used as a detector.

This disclosed conventional method includes: emitting a modulated light with a predetermined frequency towards an object using a semiconductor light-emitting device; detecting the reflex light dashed against the object; converting the reflex light into a charge using the image sensor; and calculating the distance by measuring a phase difference between the modulated light emitted from the light source and the reflex light reflected from the object.

However, according to a distance measurement apparatus using this disclosed conventional method, because an amount of light emitted from the light source is maintained at a constant level, the apparatus may have a negative impact on measurement accuracy of distance data. For instance, when the modulated light is too dark, because the ratio of the modulated light to a background light decreases, the signal to noise ratio decreases and therefore an error of measurement distance may increase. On the other hand, when the modulation light of the light source is too bright, because the image sensor is saturated with charges from the incoming light including the reflex light reflected from the object, the distance may not be measured.

In addition, because brightness decreases in inverse proportion to a square of the distance from the light source to an object, when the distance from the light source to an object is relatively near, such as when indoors, and a distance area measured is limited to the distance measurement apparatus, a large error may not be caused even if an amount of light emitted from the light source is maintained constant.

However, when the above distance measurement apparatus measures a distance from the driven vehicle to a vehicle in front thereof (i.e., when used outdoors), the objects may be varied such as a road, an oncoming car, a car traveling ahead, a guardrail, a pedestrian, etc., and measuring a distance from the distance measurement apparatus thereto may vary from several meters to infinity. Therefore, because a favorable amount of modulated light of the light source for measuring an object that is near to the distance measurement apparatus may be different from the amount of modulated light for measuring an object that is far from the distance measurement apparatus, the amount of modulated light of the light source should be dynamically changed in order to improve a measurement accuracy of distance according to a measuring distance, a background light and the like.

Furthermore, even if measuring various objects that are located at the same respective distances, the respective intensity of reflex light may change in accordance with the reflectivity of each of the measured objects. Thus, when measuring a distance of an object with a high degree of accuracy, the amount of modulated light should be changed according to a measuring condition and the like.

The above-referenced Patent Documents are listed below and are incorporated herein by reference.

1. Patent document No. 1: Japanese Patent Application Laid Open JP2005-182137
2. Patent document No. 2: Japanese Patent Application Laid Open JP2000-75030
3. Patent document No. 3: Japanese Patent Application Laid Open JP2004-32682 and its related patent family document, U.S. Pat. No. 7,119,350 to Hashimoto et al.

SUMMARY

The presently disclosed subject matter has been devised to consider the above and other problems, features and characteristics. Thus, according to an aspect of the disclosed subject matter, an embodiment of the disclosed subject matter can include a method for measurement distance with high measurement accuracy under various circumstances by adjusting a favorable amount of modulated light emitted from the light source towards an object. The method can have a simple configuration and be realized at low cost. Another embodiment of the disclosed subject matter can include a distance measurement apparatus using or performing the immediately above described method. The distance measurement apparatus can measure a distance of an object and can also generate distance data along with image data using a serial frame data format with a simple configuration and at low cost, and therefore can have practical uses related to a vehicle, a robot, security system, and the like.

The presently disclosed subject matter has been devised in view of the above described characteristics, problems and the like. Another aspect of the disclosed subject matter includes a method for a distance measurement relating to a modulated light having a predetermined frequency emitted from a light source towards an object, wherein a light intensity of the modulated light can be adjusted according to various measurement circumstances. Thus, the method of the disclosed subject matter can measure a distance of an object with high measurement accuracy, because the light intensity of the modulated light can be adjusted a favorable intensity in accordance with various objects, measurement conditions, etc.

Another aspect of the disclosed subject matter includes a distance measurement apparatus using the above-described method for a distance measurement. The distance measurement apparatus can accurately measure a distance of an object with a simple configuration and at low cost. Thus, the distance measurement apparatus can be incorporated into various sensor systems for measuring a distance of an object(s), the object(s) including an obstacle, a vehicle, an invader and the like for a vehicle, a robot, a security system, etc.

According to an aspect of the disclosed subject matter, a method for distance measurement can include: emitting a modulated light having a predetermined frequency towards an object; receiving an incoming light including a reflex light reflected from the object; converting the incoming light into a plurality of charges during each of four terms in one period of the modulated light; calculating each phase difference between the modulated light and the incoming light based on each of the plurality of charges converted during each of the four terms in the one period of the modulated light; calculating a distance to the object corresponding to each of the plurality of charges in accordance with each phase difference; and adjusting a light intensity of the modulated light in accordance with the plurality of charges converted from the incoming light.

In the above-described exemplary embodiment of a method for a distance measurement, the light intensity of the modulated light can be adjusted in accordance with the number of less charge than a predetermined threshold in the plurality of charges converted from the incoming light during at least one of the four terms in the one period of the modulated light and/or in accordance with the number of more charge than a predetermined threshold in the plurality of charges converted from the incoming light during at least one of the four terms in the one period of the modulated light. The light intensity of the modulated light can also be adjusted in accordance with the number out of the range of at least one predetermined amplitude in the plurality of charges converted from the incoming light during at least the one period of the modulated light and also can be adjusted so as to fall within the mean value or the standard deviation of amplitudes calculated in accordance with the plurality of charges converted from the incoming light during at least the one period of the modulated light within the range of a definite value.

In addition, in advance and before the above-described adjustment, the method can extract a plurality of charges corresponding to the object from each of the plurality of charges used for calculating the distance to the object. In this case, the plurality of charges corresponding to the object extracted from each of the plurality of charges used for calculating the distance to the object can also correspond to an object positioned within the range of at least one predetermined distance.

According to the above-described aspect of the disclosed subject matter, the light intensity of the modulated light emitted from the light source can be changed to a favorable intensity in accordance with various measurement circumstances. Thus, the method for distance measurement can measure the distance of an object with a high accuracy under various circumstances and can also generate distance data along with the image data using a frame data format.

According to another of the aspects of the disclosed subject matter, a method for a distance measurement can include: emitting a plurality of modulated light rays having a predetermined frequency divided into a plurality of emitting areas towards an object; receiving each incoming light including each reflex light of the plurality of emitting areas reflected from the object on each of a plurality of detecting area; converting each incoming light into a plurality of charges during each of four terms in one period of the plurality of modulated light rays; calculating each phase difference between the plurality of modulated light rays and each incoming light based on each of the plurality of charges converted during each of the four terms in the one period of the plurality of modulated light rays; calculating each distance from each of the plurality of emitting areas to the object corresponding to each of the plurality of charges in accordance with each phase difference; and adjusting each light intensity of the plurality of modulated light rays in each of the plurality of emitting areas in accordance with each of the plurality of charges converted from each incoming light.

In the immediately above-described exemplary embodiment of a method for a distance measurement, each light intensity of the plurality of modulated light rays in each of the plurality of emitting areas can be adjusted in accordance with each number of less charge than each predetermined threshold in each of the plurality of charges converted from each incoming light during at least one of the four terms in the one period of the plurality of modulated lights and/or in accordance with each number of more charge than each predetermined threshold in each of the plurality of charges converted from each incoming light during at least one of the four terms in the one period of the plurality of modulated light rays. Each light intensity of the plurality of modulated light rays in each of the plurality of emitting area can also be adjusted in accordance with each number out of the range of at least one predetermined amplitude in each of the plurality of charges converted from each incoming light during at least the one period of the plurality of modulated light rays and also can be adjusted so as to fall within each mean value or each standard deviation of amplitudes calculated in accordance with each of the plurality of charges converted from each incoming light during at least the one period of the plurality of modulated light rays within the range of each definite value.

In addition, in advance before the immediately above-described adjustment, the method can extract each of a plurality of charges corresponding to the object from each of the plurality of charges used for calculating each distance from each of the plurality of emitting areas to the object. In this case, each of the plurality of charges corresponding to the object extracted from each of the plurality of charges used for calculating each distance from each of the plurality of emitting areas to the object can corresponded to an object positioned within the range of at least one predetermined distance.

According to the above-described aspects of the disclosed subject matter, each light intensity of the modulated light rays emitted from each of the plurality of emitting areas can be adjusted to a favorable intensity in accordance with each of the plurality of detecting areas. Thus, the above-described method for distance measurement can measure the distance of an object with higher accuracy under various circumstances and can generate accurate distance data along with the image data using a frame data format. In addition, the method can include prevention from using unnecessary power consumption by controlling a favorable light intensity of the modulated light based on each emitting area.

According to another aspect of the disclosed subject matter, a distance measurement apparatus using a method for a distance measurement can include: a light source configured to emit modulated light having a predetermined frequency towards the object; a solid state camera configured to receive the incoming light including the reflex light reflected from the object and to convert the incoming light into the plurality of charges during each of the four terms in the one period of the modulated light; a distance data generator configured to calculate each phase difference between the modulated light and the incoming light based on each of the plurality of charges converted during each of the four terms in the one period of the modulated light and to calculate the distance to the object corresponding to each of the plurality of charges in accordance with each phase difference; and a controller configured to synchronize both the light source and the solid state camera and to adjust the light intensity of the modulated light emitted from the light source.

In the immediately above-described aspect, the controller can carry out the adjustment and the extraction described in paragraphs [0016]-[0017]. Thus, the distance measurement apparatus using the method described in paragraph [0015] can accurately measure a distance of an object with a simple configuration and at low cost by using a typical controller for a solid state camera.

According to another exemplary embodiment of another aspect of the disclosed subject matter, a distance measurement apparatus using a method for a distance measurement can include: a plurality of light sources configured to be divided into a plurality of emitting areas and configured to emit a plurality of the modulated light rays having a predetermined frequency towards the object; a solid state camera configured to include a plurality of detecting areas, to receive each incoming light including each reflex light of the plurality of emitting areas reflected from the object on each of the plurality of detecting areas therein and to convert each incoming light into each of the plurality of charges during each of the four terms in the one period of the plurality of modulated lights; a distance data generator configured to calculate each phase difference between the plurality of modulated light rays and each incoming light based on each of the plurality of charges converted during each of the four terms in the one period of the plurality of modulated light rays and to calculate each distance from each of the plurality of emitting areas to the object corresponding to each of the plurality of charges in accordance with each phase difference; and a controller configured to synchronize both the plurality of light sources in each of the plurality of emitting areas and the solid state camera, and to adjust each light intensity of the plurality of modulated light rays in each of the plurality of emitting areas.

In the immediately above-described exemplary embodiment, the controller can carry out each adjustment and each extraction described in paragraphs [0020]-[0021]. Thus, the distance measurement apparatus using the method described in paragraph [0019] can measure a distance of an object with higher accuracy and with a simple configuration by using a typical controller for a solid state camera.

BRIEF DESCRIPTION OF THE DRAWINGS

The above and other characteristics and features of the disclosed subject matter will become clear from the following description with reference to the accompanying drawings, wherein.

DETAILED DESCRIPTION OF EXEMPLARY EMBODIMENTS

First Exemplary Embodiment

An example of a distance measurement apparatus in accordance with a first exemplary embodiment of the disclosed subject matter will now be described in detail with reference to FIGS. 1-13.

[Configuration of a Distance Measurement Apparatus]

A particular configuration of the distance measurement apparatus in accordance with the first exemplary embodiment will now be given.

Figure 1:
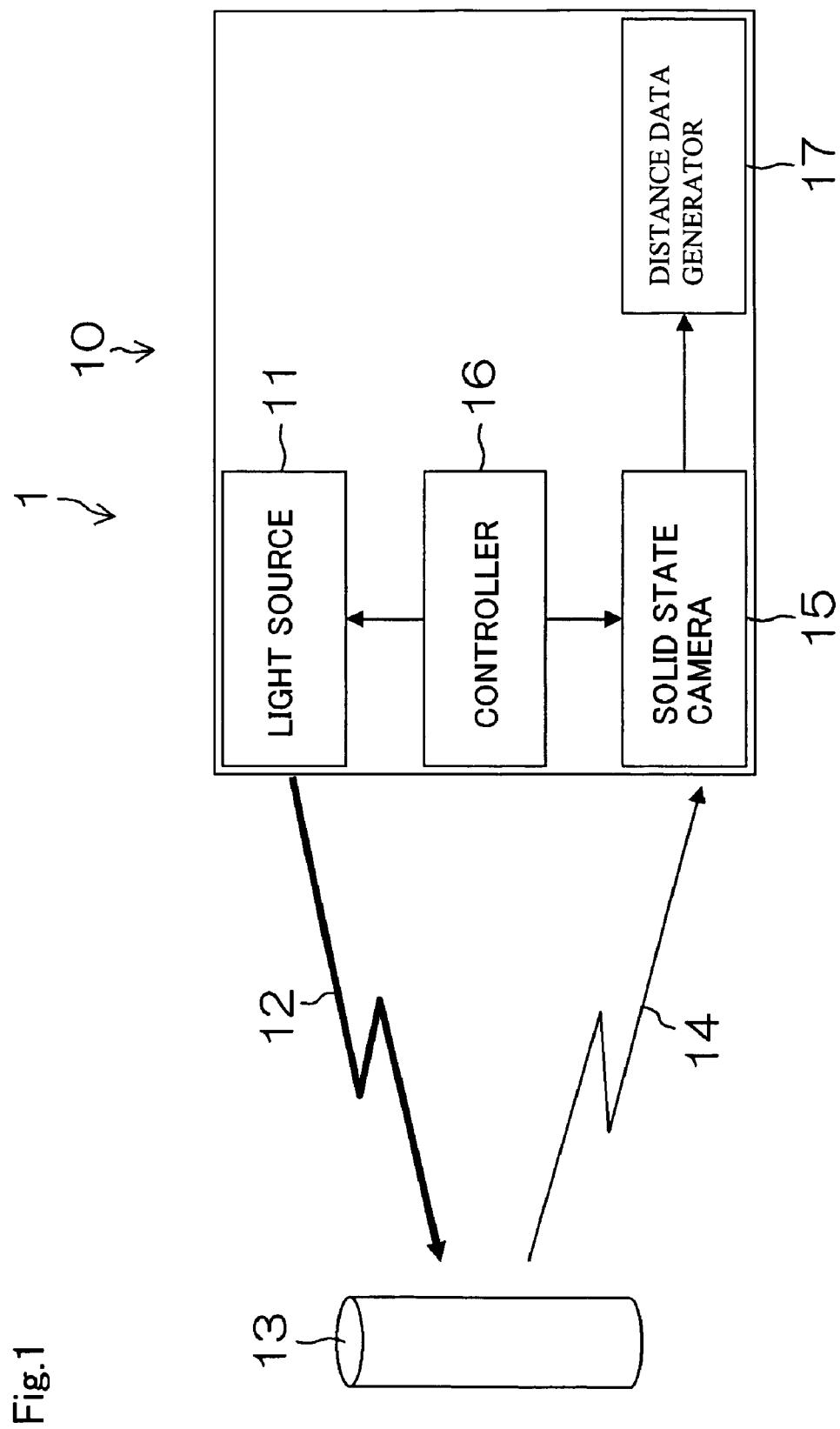
FIG. 1 is a block diagram of an example of a distance measurement apparatus made in accordance with principles of the disclosed subject matter.

FIG. 1 is a block diagram of the exemplary distance measurement apparatus made in accordance with principles of the disclosed subject matter. The distance measurement apparatus 1 can be configured to include a distance image sensor 10 using the TOF method as shown in FIG. 1. The distance image sensor 10 can include a light source 11, a solid state camera 15, a controller 16 and a distance data generator 17.

The light source 11 can be configured to emit a modulated light 12 having a predetermined frequency (e.g. an infrared light or a visible light modulated with high speed using a sine wave, a square wave, etc.) towards a space in which a distance from the light source 11 to an object 13 should be measured. Thus, an LED and the like can be used as the light source 11 and can be modulated with high speed.

The solid state camera 15 can be configured to receive an incoming light 14 including a reflex light reflected from an object in the modulated light emitted from the light source 11. Thus, the solid state camera 15 can include: a plurality of photoelectric conversion chips for converting the incoming light into a plurality of charges (or signals); a plurality of charge accumulators for accumulating the plurality of charges; a distributor for distributing the plurality of charges converted by the plurality of photoelectric conversion chips to the plurality of charge accumulators in synchronization with the modulated light emitted from the light source 11.

The controller 16 can be configured to synchronize both the solid state camera 15 and the light source 11 with respect to each other. The distributor of the solid state camera 15 can distribute the plurality of charges converted by the plurality of photoelectric conversion chips to the plurality of charge accumulators with high speed in accordance with a synchronizing signal output from the controller 16.

The distance data generator 17 can: carry out a predetermined calculation described later in accordance with the plurality of charges converted by the plurality of photoelectric conversion chips; calculate a phase difference between the modulated light 12 emitted from the light source 11 and the incoming light 14 including the reflex light reflected from the object 13 received by the solid state camera 15; calculate the distance to the object 13; and generate serial distance data using a serial frame data format if necessary.

[Principle for Measuring a Distance]

A principle for measuring a distance will now be described in detail.

Figure 2:
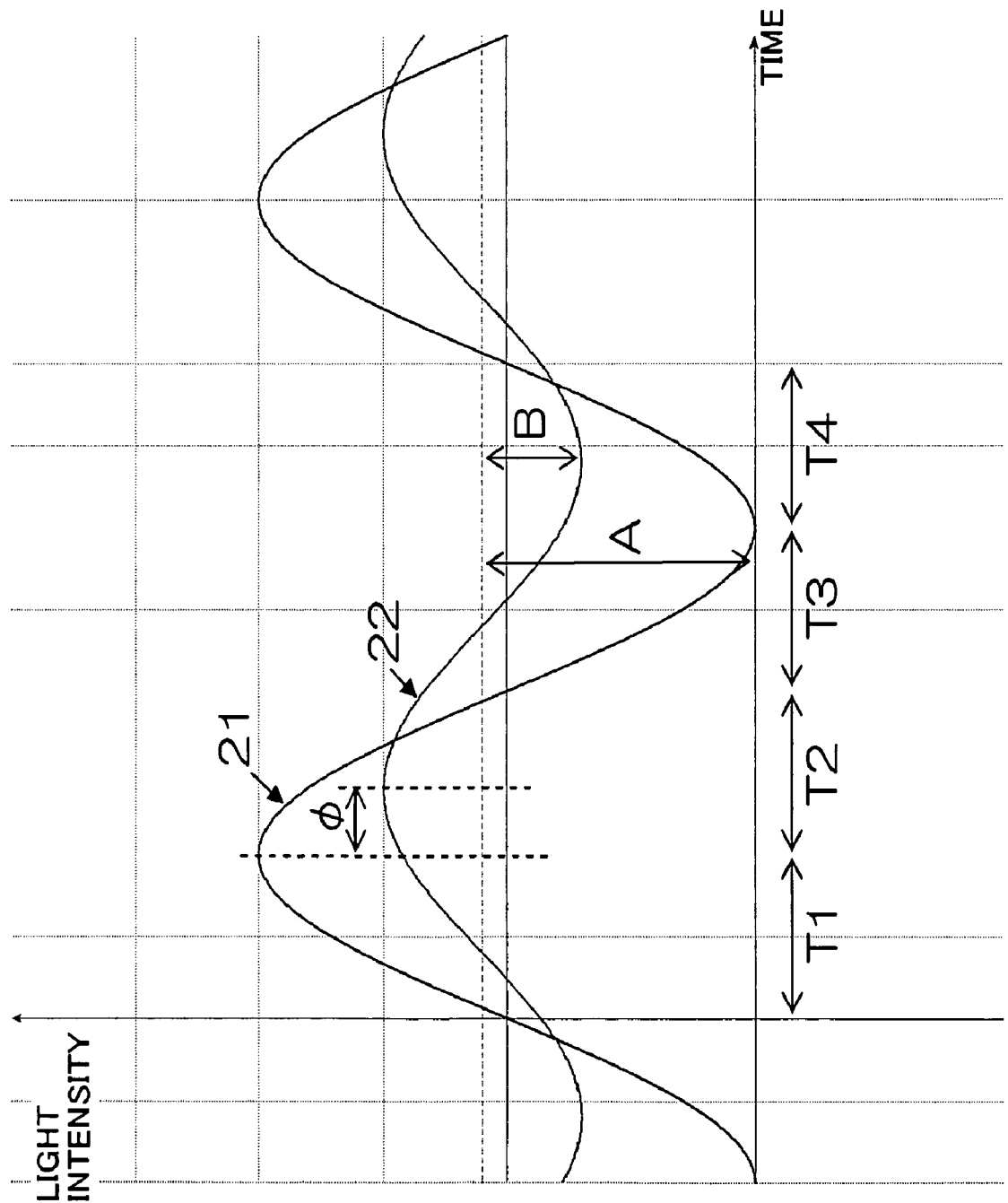
FIG. 2 is an explicative graph showing a principle for measuring distance.

FIG. 2 is an explicative diagram showing a principle for measuring a distance. A sine wave 21 shows a modulated light emitted from the light source 11 towards a space in which a distance to an object should be measured. A sine wave 22 shows an incoming light including a reflex light reflected from the object received by the solid state camera 15. A phase difference $\phi$ between the sine wave 21 and the sine wave 22 can show a delay time for time of flight between the light source 11 and the object. Thus, when the incoming light does not include the reflex light reflected from the object, the phase difference $\phi$ can be infinite and the sine wave 22 of the incoming light may form a substantially flat wave.

A period of the sine wave 21 of the modulated light emitted from the light source 11 towards the object can be divided into four terms as shown in FIG. 2, wherein T1 is a term from 0 degree to 90 degrees, T2 is a term from 90 degrees to 180 degrees, T3 is a term from 180 degrees to 270 degrees and T4 is a term from 270 degrees to 360 degrees. When each of four charges accumulated during each of the four terms of the incoming light (the sine wave 22 in FIG. 2) is C1, C2, C3 and C4, a relation of the phase difference $\phi$ to each charge C1, C2, C3 and C4 is as follows.

$$\frac{C1 - C3}{C2 - C4} = \frac{\sin\phi}{\cos\phi} = \tan\phi \quad \text{(formula 1)}$$

Thus, $$\phi = \mathrm{Tan}^{-1}\left(\frac{C1 - C3}{C2 - C4}\right)$$

Because the speed of light is approximately $3 \times 10^8$ meter/second, a distance from the light source 11 to the object can be calculated by multiplying the phase difference $\phi$ by the speed of light. In addition, an ambient light is not required to be considered as referenced in the formula 1 and the distance to the object can be calculated even if each charge C1, C2, C3 and C4 can be converted using the incoming light including the reflex light reflected from the object. The above-described distance measurement can be calculated in each photo-chip of the plurality of photoelectric conversion chips.

When the solid state camera 15 receives the incoming light, that is, can photograph the view on the plurality of photoelectric conversion chips and can convert the incoming light into a plurality of charges using the plurality of photoelectric conversion chips, both image data corresponding to the incoming light including the reflex light reflected from the object photographed by the solid state camera 15 and each distance calculated using each photo-chip of the plurality of photoelectric conversion chips can be generated in the distance measurement apparatus 1.

Thus, the distance measurement apparatus 1 can calculate distance data to all or a portion of the photo-chips of the plurality of photoelectric conversion chips that are converted or activated by the incoming light and can also calculate voluntary distance data to voluntary photo-chips of the plurality of photoelectric conversion chips. Thus, the distance measurement apparatus 1 can calculate distances to voluntary objects even if the solid state camera 15 receives the incoming light and the incoming light includes a plurality of reflex lights reflected from a plurality of objects.

In addition, the image data can correspond to the distance data with respect to each photo-chip of the plurality of photoelectric conversion chips. Thus, a serial distance data with respect to voluntary photo-chips can be generated along with a serial image data using a serial image data format by calculating distance data of the incoming light on the voluntary photo-chips of the plurality of photoelectric conversion chips in the solid state camera 15 and repeating the above calculation in serial to each frame.

Furthermore, because a total amount of charge used as a general image data can be (C1+C2+C3+C4), the mean charge A can be as follows.

$$A = \frac{C1 + C2 + C3 + C4}{4} \quad \text{(formula 2)}$$

An amplitude B of the reflex light reflected from the object in the sine wave 22 of the incoming light received by the solid state camera 15 can be described by the following formula.

$$B = \frac{\sqrt{(C1 - C3)^2 + (C2 - C4)^2}}{2} \quad \text{(formula 3)}$$

The modulated frequency of the light source 11 can be several tens of mega hertz and therefore the one period of the modulated frequency can be several tens of nanoseconds (ns).

[Operation of a Distance Measurement Apparatus]

Various specific operations of a distance measurement apparatus 1 will now be described in detail with reference to FIGS. 3-13.

[Exemplary Operation 1 of a Distance Measurement Apparatus]

Figure 3:
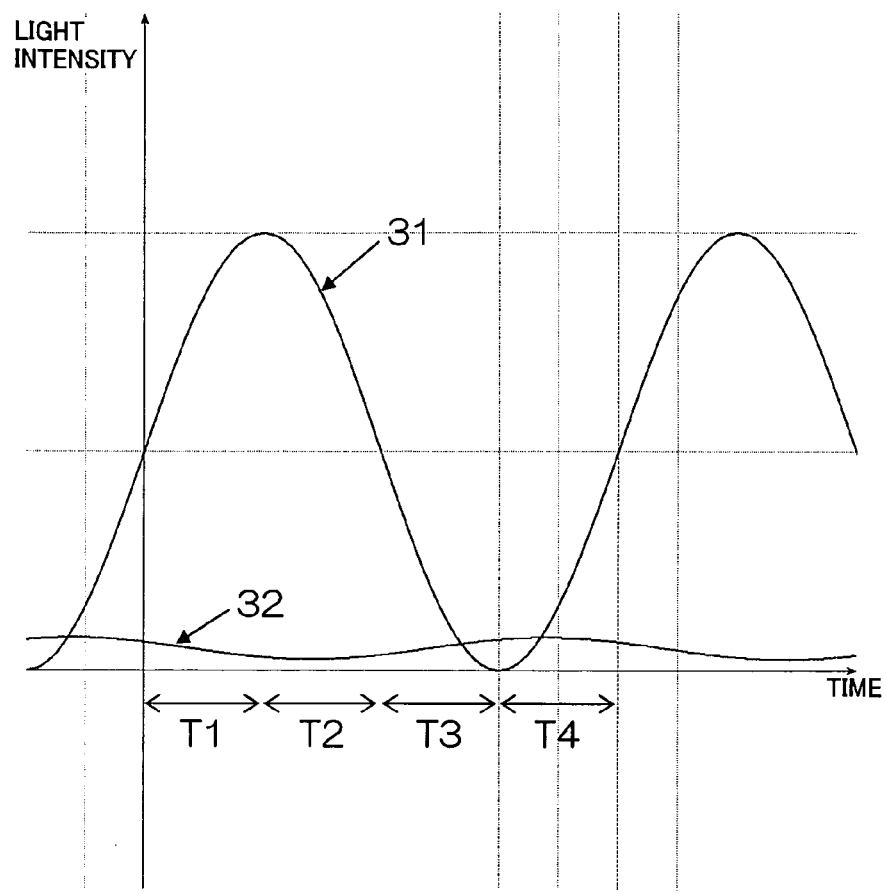
FIG. 3 is a timing chart showing a possible relation between a modulated light and an incoming light when an object is far from the distance measurement apparatus and an ambient light is limited, or when a reflectivity of an object is extremely low.

FIG. 3 is a timing chart showing a possible relation between a modulated light and an incoming light when an object is far from the distance measurement apparatus 1 and ambient light is limited, or when a reflectivity of an object is extremely low.

In case of FIG. 3, a light peak intensity of the incoming light 32 is extremely small in comparison to that of the modulated light 31 emitted from the light source 11. That is to say, because the amount of the incoming light is extremely small, the charge accumulated in the solid state camera 15 also becomes very small. When the charge accumulated in the solid state camera 15 is very small, because the solid state camera 15 may be more likely to be affected by the photon shot noise and the like, the calculating error of the phase difference $\phi$ may become large.

Figure 4:
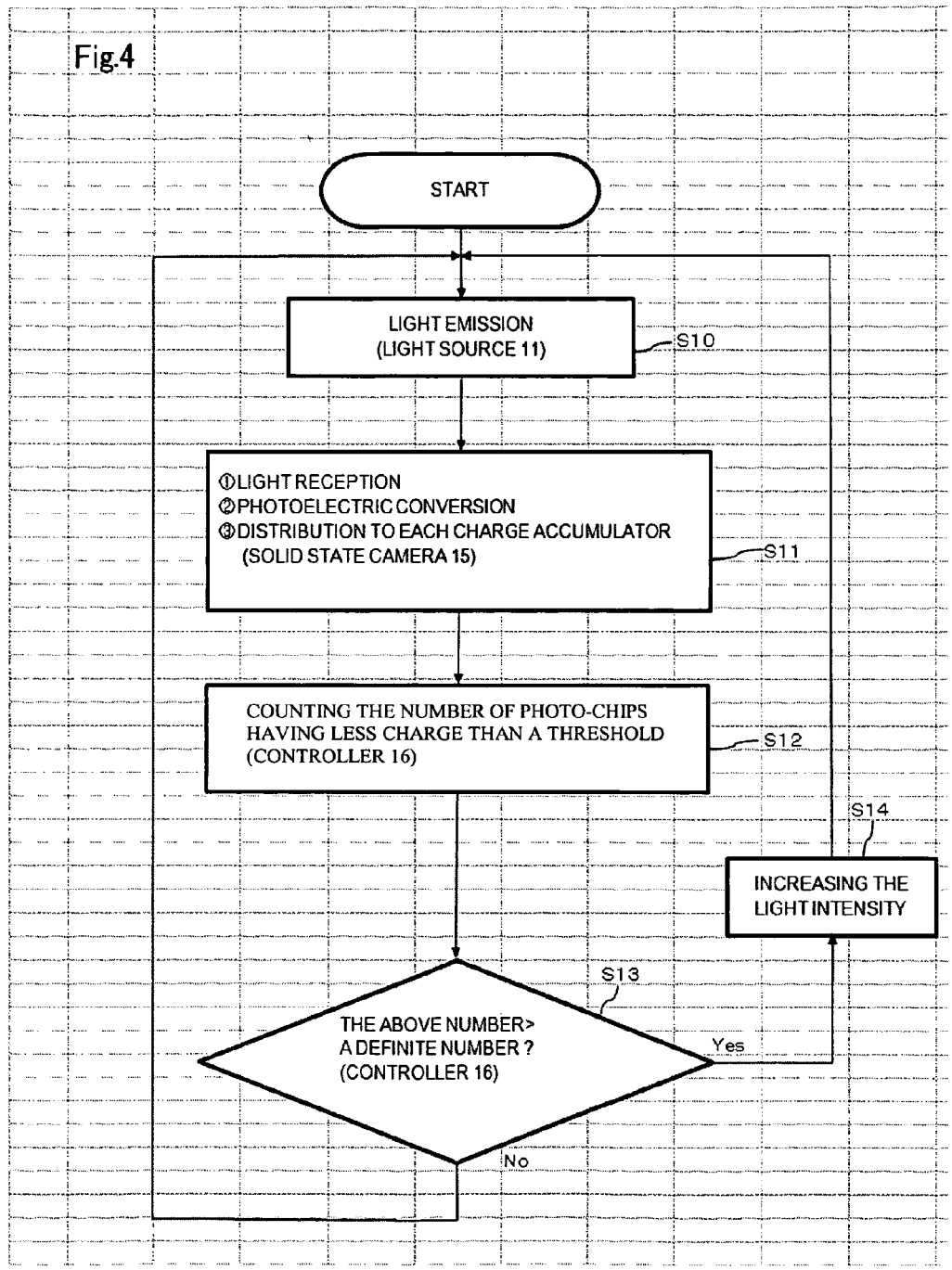
FIG. 4 is an explicative flow chart showing the exemplary operation 1 of the distance measurement apparatus in accordance with the first exemplary embodiment of the disclosed subject matter.

FIG. 4 is an explicative flow chart showing the exemplary operation 1 of the distance measurement apparatus 1 in accordance with a first exemplary embodiment of the disclosed subject matter. Under the circumstance shown in FIG. 3, the distance measurement apparatus 1 can operate based on the flow chart shown in FIG. 4 in order to prevent or decrease the calculating error of the phase difference $\phi$ caused due to the small amount of the incoming light.

The following process of the above-described exemplary operation 1 can be mainly carried out by the controller 16 or other controller, which can be provided in addition to the controller 16 in order to carry out other processes including the following process.

Initially, the light source 11 can emit the modulated light in accordance with the synchronizing signal output from the controller 16 towards a space in which a distance of an object should be measured (Step S10). The solid state camera 15 can: receive the incoming light including the reflex light reflected from the object in the space where the modulated light is emitted from the light source 11; convert the incoming light into a plurality of charges using the plurality of photoelectric conversion chips; and distribute each converted charge to each of the plurality of charge accumulators in accordance with the synchronizing signal output from the controller 16 (Step S11).

The distance data generator 17 can: carry out the predetermined calculation of the formula 1 according to each charge that is distributed; calculate the phase difference $\phi$ between the modulated light and the incoming light; calculate the distance to the object; and generate and transmit the distance data to a frame using a frame data format.

Then, the controller 16 can count the number of the photoelectric conversion chips having a charge that is less than a predetermined threshold in at least one term of the plurality of photoelectric conversion chips charged during the four terms by the incoming light (Step S12). If the number is more than a definite number (Yes in Step S13), the controller 16 can control so as to increase the light intensity (that is, the amount of the modulated light) of the light source 11 because the amount of the modulated light can be determined as being small it by the controller 16 (Step S14). The processes from Step S10 to Step S14 can be repeated until the number becomes less than the definite number (No in Step S13).

In the above-described exemplary operation 1, when the number of the photoelectric conversion chips counted in Step S12 exceeds the definite number (Yes in Step S13), the light intensity of the light source 11 can increase because the controller 16 can determine that the amount of the modulated light emitted from the light source 11 is small (Step S14). Thus, because the amount of the incoming light can be maintained at a favorable amount, the calculating error of the phase difference $\phi$ that can be caused by a small amount of the incoming light can be prevented or can be reduced and therefore the distance measurement accuracy can improve and distance data can be generated with high accuracy.

[Exemplary Operation 2 of a Distance Measurement Apparatus]

Figure 5:
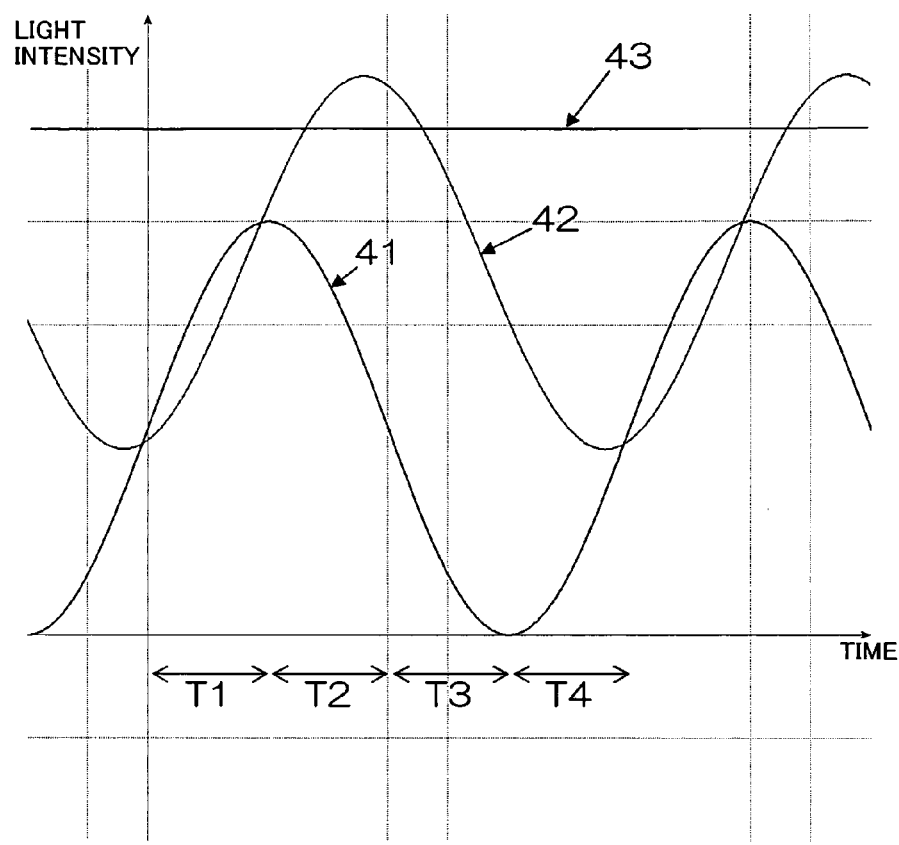
FIG. 5 is an explicative graph showing a possible relation between a modulated light and an incoming light when reflectivity of an object is high under a strong ambient light.

FIG. 5 is an explicative graph showing a possible relation between a modulated light and an incoming light when reflectivity of an object is high under a strong ambient light. A sine wave 41 shows a modulated light emitted from the light source 11 and a sine wave 42 shows an incoming light received by the solid state camera 15 in FIG. 5.

In this case, a straight line 43 shows the light intensity at which the solid state camera 15 is saturated with the charge corresponding thereto. Therefore, because the solid state camera 15 can be saturated with charge, and each charge of C1, C2, C3 and C4 cannot increase during a term of a higher intensity than the straight line 43 in the sine wave 42, the saturation during these terms may cause an error in the calculation of the phase difference $\phi$.

Figure 6:
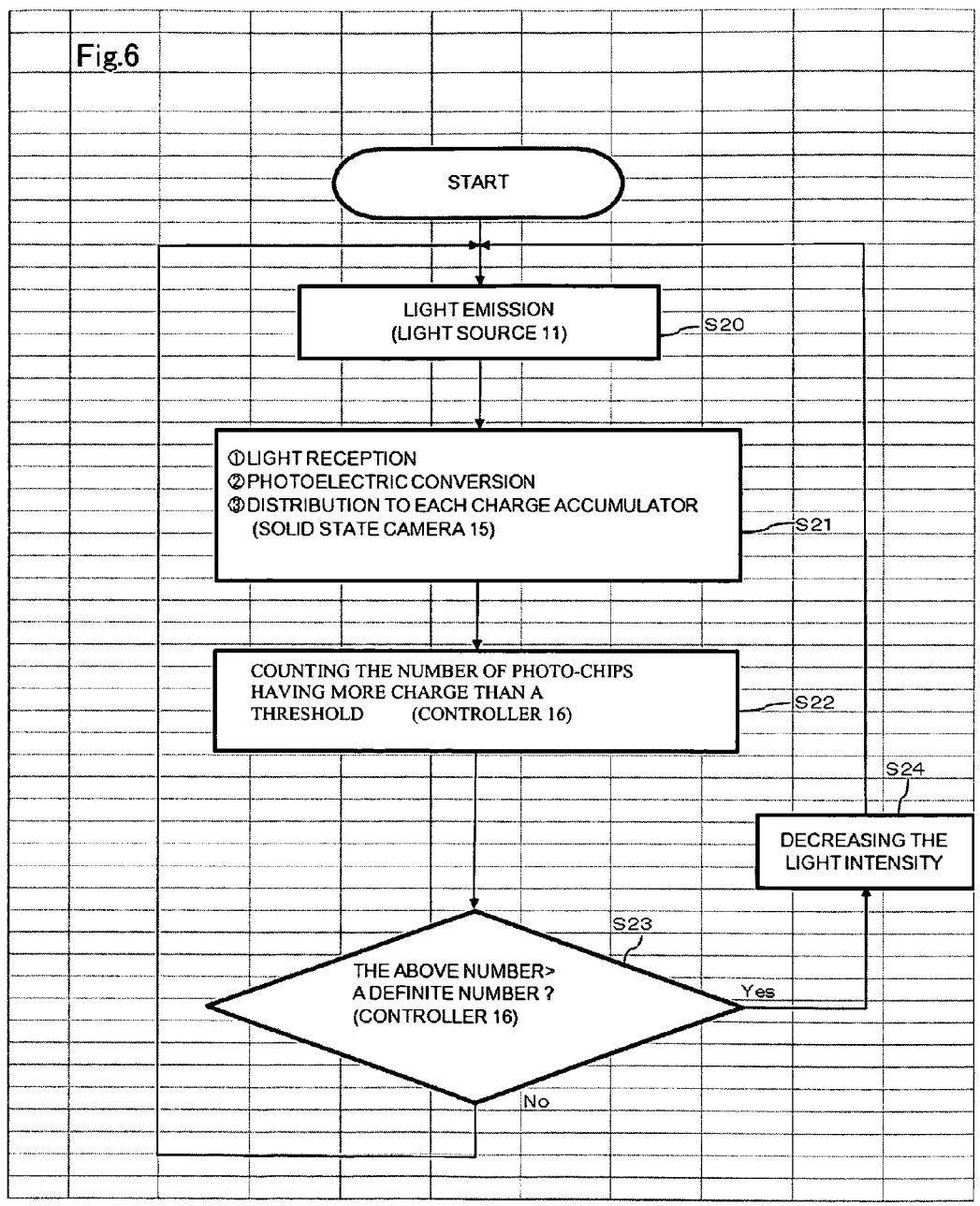
FIG. 6 is an explicative flow chart showing the exemplary operation 2 of the distance measurement apparatus of the first exemplary embodiment of the disclosed subject matter.

FIG. 6 is an explicative flow chart showing the exemplary operation 2 of the distance measurement apparatus 1 in accordance with a first exemplary embodiment of the disclosed subject matter. Under the circumstance shown in FIG. 5, the distance measurement apparatus 1 can operate based on the flow chart shown in FIG. 6 in order to prevent or decrease the calculating error of the phase difference $\phi$ caused by saturating the solid state camera 15 with charge corresponding to the large amount of incoming light.

The following process of the above-described exemplary operation 2 can be mainly carried out by the controller 16 or by another controller, which can be provided in addition to the controller 16, in order to carry out other processes including the following process.

Initially, the light source 11 can emit the modulated light in accordance with the synchronizing signal output from the controller 16 towards a space in which a distance to an object should be measured (Step S20). The solid state camera 15 can: receive the incoming light including the reflex light reflected from the object in the space where the modulated light is emitted from the light source 11; convert the incoming light into a plurality of charges using the plurality of photoelectric conversion chips; and distribute each charge that is converted to each of the plurality of charges accumulators in accordance with the synchronizing signal output from the controller 16 (Step S21).

The distance data generator 17 can: carry out the predetermined calculation of the formula 1 according to each charge that is distributed; calculate the phase difference $\phi$ between the modulated light and the incoming light; calculate the distance of the object; and generate and transmit the distance data to a frame using a frame data format.

Then, the controller 16 can count the number of the photoelectric conversion chips having more charge than a predetermined threshold in at least one of the plurality of photoelectric conversion chips charged during the four terms by the incoming light (Step S22), or the controller 16 can count the number of the photoelectric conversion chips out of the range of predetermined thresholds (e.g. a peak light intensity value on the line 43) by determining a predetermined range to the amplitude value B of the reflex light reflected from the object in the incoming light (Step S22).

If the number is more than a definite number (Yes in Step S23), the controller 16 can decrease the light intensity (that is, the amount of the modulated light) of the light source 11 because the amount (or a peak value of the light intensity) of the modulated light can be determined as large by the controller 16 (Step S24). The processes from Step S20 to Step S24 can be repeated until the number becomes less than the definite number (No in Step S23).

In the exemplary operation 2 as described above, when the number of the photoelectric conversion chips counted in Step S22 becomes more than the definite number (Yes in Step S23), the light intensity of the modulated light emitted from the light source 11 can be decreased because the controller 16 can determine that the amount of the modulated light is too large (Step S24). Thus, because the amount of the reflex light in the incoming light can be maintained at a favorable amount, the calculating error of the phase difference φ caused because of an excessive amount of the incoming light can be prevented or can be reduced and therefore the distance measurement accuracy can improve and the distance data can be generated with high accuracy.

[Exemplary Operation 3 of a Distance Measurement Apparatus]

Figure 7:
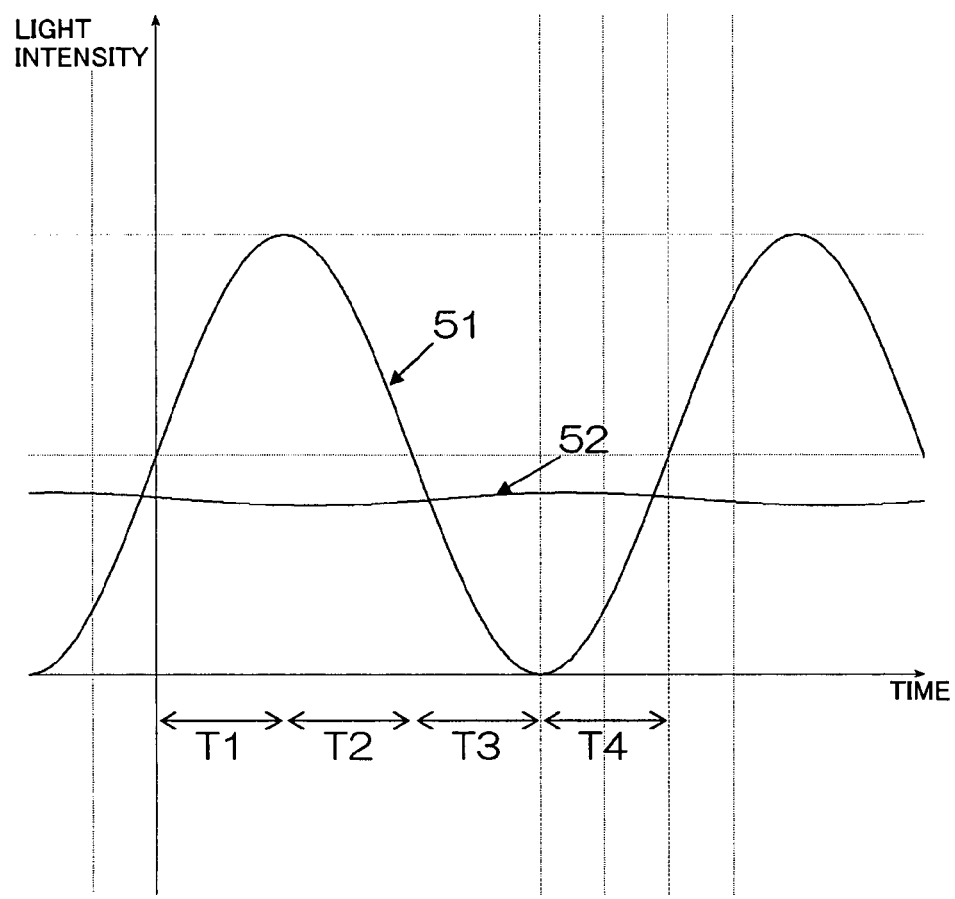
FIG. 7 is an explicative graph showing a possible relation between a modulated light and an incoming light when an ambient light is relatively strong and a distance to an object is far, or when a reflectivity of the object is extremely low.

FIG. 7 is an explicative graph showing a possible relation between a modulated light and an incoming light when an ambient light is relatively strong and a distance of an object is far, or when a reflectivity of an object is extremely low. In FIG. 7, a sine wave 51 shows a modulated light emitted from the light source 11 and a sine wave 52 shows an incoming light received by the solid state camera 15.

The incoming light 52 can be a sufficient amount of light for converting from a light into a charge using the plurality of photoelectric conversion chips, however, when the phase difference φ is calculated according to the above-described formula 1, each value of formulas (C1-C3) and (C2-C4) becomes small. Therefore, even if a small noise is created or observed during the process of converting the incoming light 52 into each of C1, C2, C3 and C4 and distributing them to the plurality of charge accumulators, there is a possibility that such noise easily swings or disrupts the phase difference φ.

Under the circumstance shown in FIG. 7, the distance measurement apparatus 1 can operate based on the flow chart shown in FIG. 6 (which is the same as that of the exemplary operation 2) in order to prevent or decrease the calculating error of the phase difference φ caused when the very small reflex light may not be a sufficient amount of incoming light 52.

That is to say, if the number of the photoelectric conversion chips counted in Step S22 exceeds a definite number (Yes in Step S23), the controller 16 can decrease the light intensity of the modulated light emitted from the light source 11 because the amount (or a peak value of the light intensity) of the modulated light can be determined as large by the controller 16 (Step S24). Thus, because the amount of the reflex light in the incoming light can be maintained at a relatively favorable amount even in a difficult circumstance, the calculating error of the phase difference φ caused due to small reflex light for the amount of incoming light can be prevented or can be reduced and therefore the distance measurement accuracy can improve and the distance data can be generated with high accuracy.

[Exemplary Operation 4 of a Distance Measurement Apparatus]

When an object photographed by the solid state camera 15 stays constant, the amplitude B found by the above-described formula 3 can be notionally proportional to the light intensity of the modulated light emitted from the light source 11. Therefore, the controller 16 can calculate the mean value of amplitude B in the plurality of photoelectric conversion chips converted during the four terms or the standard deviation of amplitude B in the plurality of photoelectric conversion chips that are converted, and can increase/decrease the light intensity of the modulated light so as to have the above-referenced calculated value fall within the range of a definite value. In the above-described case, the distance measurement apparatus 1 can operate based on the flow chart shown in FIG. 8.

Figure 8:
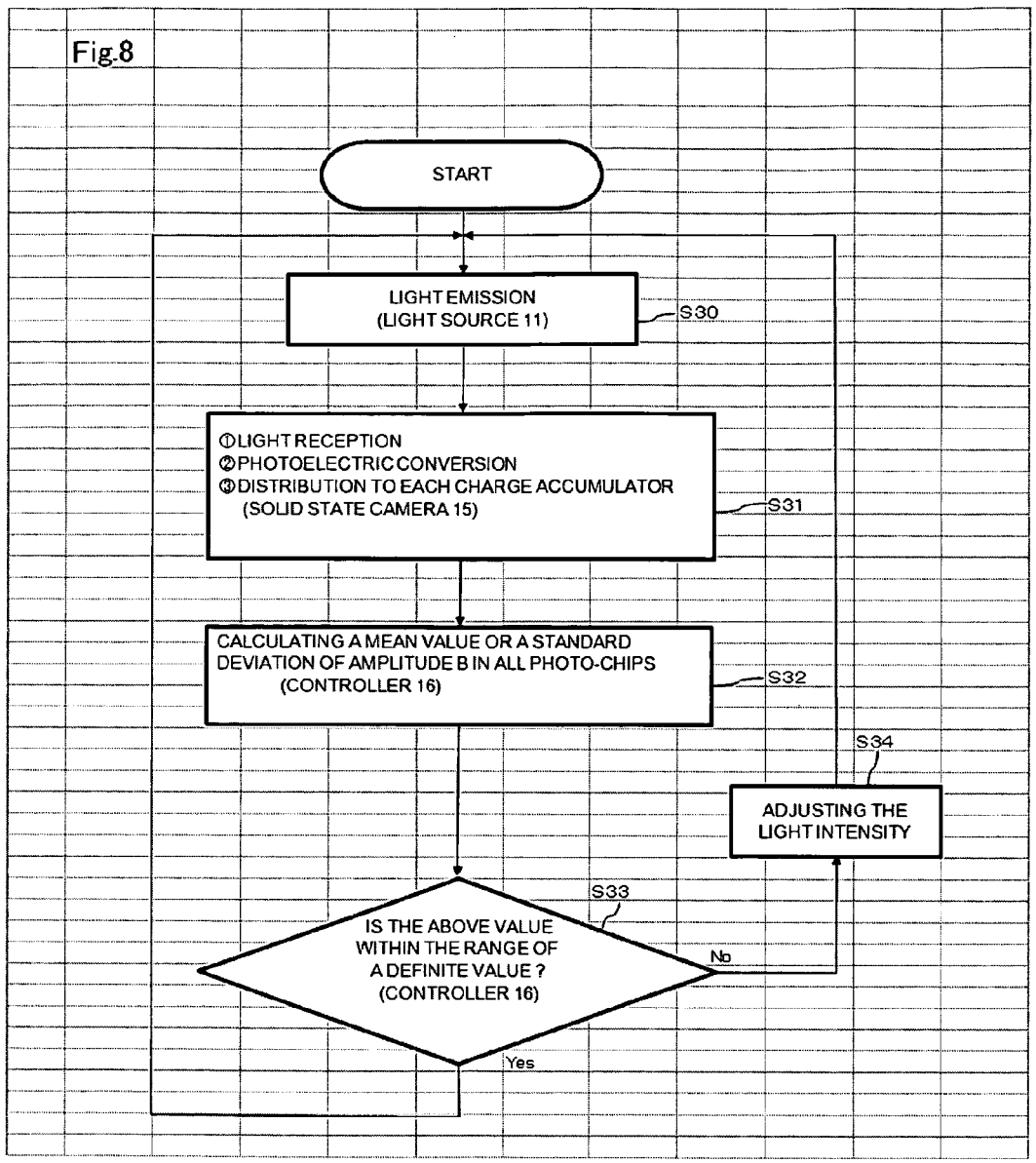
FIG. 8 is an explicative flow chart showing the exemplary operation 4 of the distance measurement apparatus of the first exemplary embodiment of the disclosed subject matter.

FIG. 8 is an explicative flow chart showing the exemplary operation 4 of the distance measurement apparatus 1 in accordance with a first exemplary embodiment of the disclosed subject matter. The following process of the above-described exemplary operation 4 can be mainly carried out by the controller 16 or by another controller, which can be provided in addition to the controller 16 in order to carry out other processes including the following process.

Initially, the light source 11 can emit the modulated light in accordance with the synchronizing signal output from the controller 16 towards a space in which a distance to an object should be measured (Step S30). The solid state camera 15 can: receive the incoming light including the reflex light reflected from the object in the space where the modulated light is emitted from the light source 11; convert the incoming light into a plurality of charges using the plurality of photoelectric conversion chips; and distribute each charge that is converted to each of the plurality of charges accumulators in accordance with the synchronizing signal output from the controller 16 (Step S31).

The distance data generator 17 can: carry out the predetermined calculation of the formula 1 according to each charge that is distributed; calculate the phase difference φ between the modulated light and the incoming light; calculate the distance of the object; and generate and transmit the distance data to a frame using a frame data format.

Then, the controller 16 can calculate the mean value of amplitude B in the plurality of photoelectric conversion chips that are converted during the four terms or the standard deviation of amplitude B in the plurality of photoelectric conversion chips that are converted (Step S32). The controller 16 can adjust (increase or decrease) the light intensity of the modulated light so as to have the above-referenced calculating value(s) fall within the range of a definite value (No in Step S33 and Step S34). The processes from Step S30 to Step S34 can be repeated until the calculated value falls within the range of the definite value (Yes in Step S33).

In the exemplary operation 4 as described above, because the amplitude B which impacts the accuracy of distance data can be controlled/maintained so as to maximize the number of the photoelectric conversion chips in the favorable range for measuring a distance, the distance measurement accuracy can further improve and therefore the distance data can be generated with higher accuracy.

[Exemplary Operation 5 of a Distance Measurement Apparatus]

When the distance measurement apparatus 1 is used indoors, both the brightness and the distance of the background may not change in many cases. When measuring the distance from the distance measurement apparatus 1 to an object, the measurement accuracy of distance data can increase by extracting only data associated with the intended object to be measured and not data associated with the background.

For instance, when a reflectivity of the object other than the background is high in comparison with that of the background or the object is positioned very close to the distance measurement apparatus 1 as compared to the background, because the amount of reflex light reflected from the object is large when measuring the distance using the typical modulated light emitted from the light source 11, accurate distance data may not be generated due to saturation of the solid state camera 15 with the charge accumulated and the like.

On the contrary, when reflectivity of the object other than the background is very low in comparison with that of the background, or when the object is positioned far from the distance measurement apparatus 1, accurate distance data may not be generated because of the small amount of reflex light reflected from the object.

Figure 9:
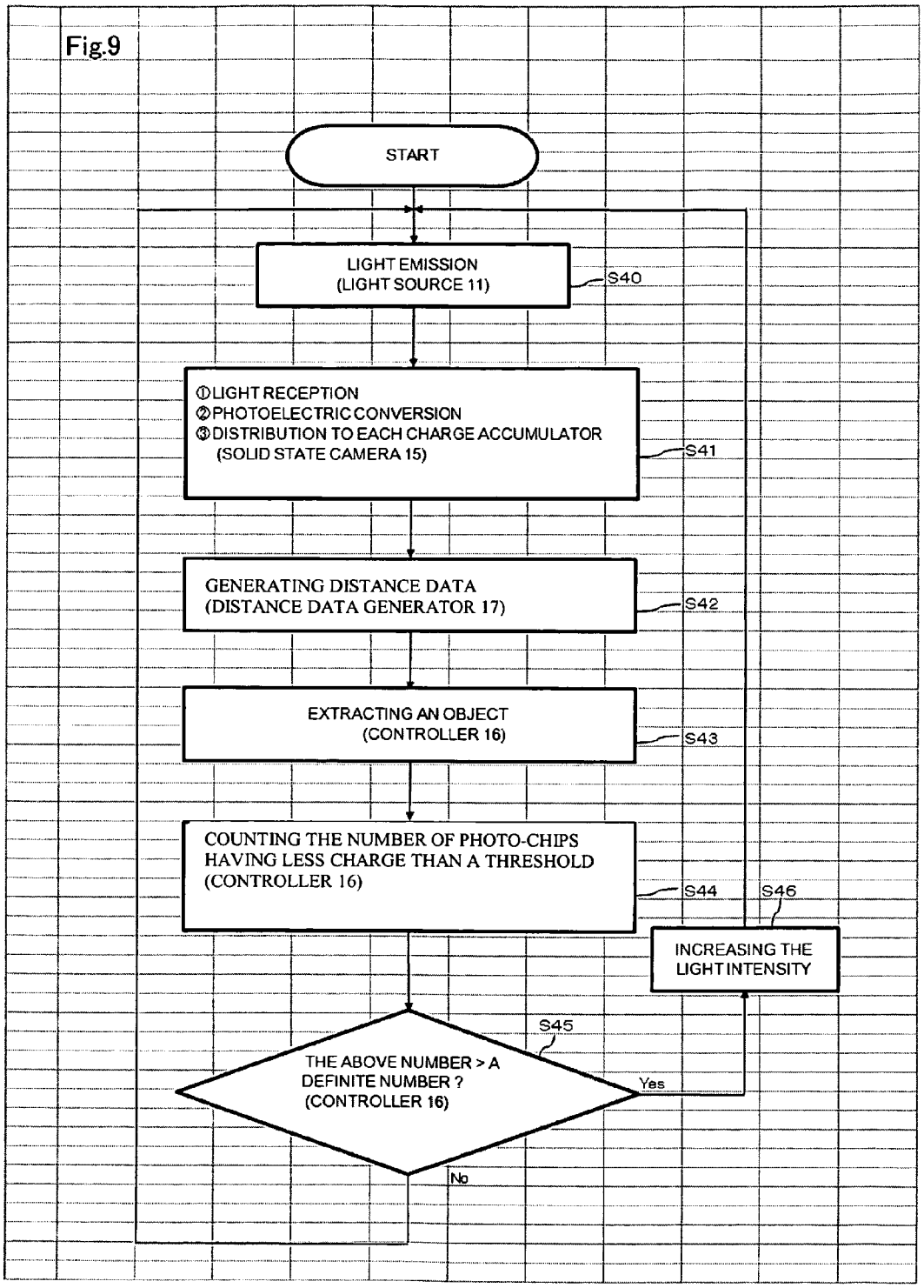
FIG. 9 is an explicative flow chart showing the exemplary operation 5 of the distance measurement apparatus of the first exemplary embodiment of the disclosed subject matter.
Figure 10:
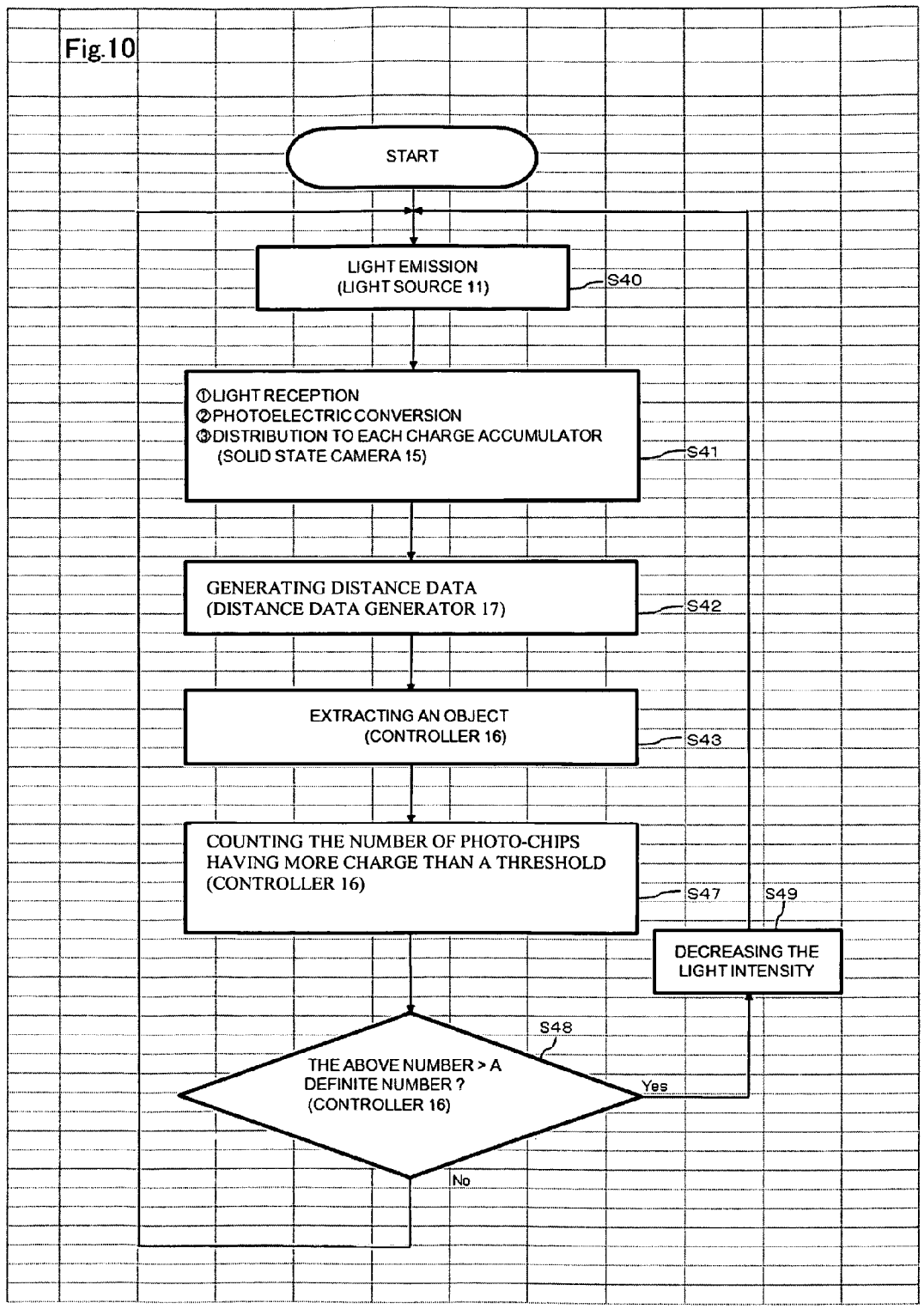
FIG. 10 is another explicative flow chart showing the exemplary operation 5 of the distance measurement apparatus of the first exemplary embodiment of the disclosed subject matter.

Therefore, the controller 16 can: extract data related to the object and not the background from distance data generated by the distance data generator 17; carry out the same process as that shown in FIG. 9-10 for each of the plurality of photoelectric conversion chips corresponding to the extracted object; adjust the light intensity of the modulated light emitted from the light source 11; and thus generate distance data with more accuracy.

FIGS. 9-10 are explicative flow charts showing the exemplary operation 5 of the distance measurement apparatus 1 in accordance with the first exemplary embodiment of the disclosed subject matter. The following process of the above-described exemplary operation 5 can be mainly carried out by the controller 16 or by another controller, which can be provided in addition to the controller 16 in order to carry out other processes including the following process.

Initially, the light source 11 can emit the modulated light in accordance with the synchronizing signal output from the controller 16 towards a space in which a distance to an object should be measured (Step S40). The solid state camera 15 can: receive the incoming light including the reflex light reflected from the object in the space where the modulated light is emitted from the light source 11; convert the incoming light into a plurality of charges using the plurality of photoelectric conversion chips; and distribute each charge to each of the plurality of charges accumulators in accordance with the synchronizing signal output from the controller 16 (Step S41).

The distance data generator 17 can: carry out the predetermined calculation of the formula 1 according to each charge that is distributed; calculate the phase difference $\phi$ between the modulated light and the incoming light; calculate the distance of the object; and generate and transmit the distance data to a frame using a frame data format (Step S42).

Then, the controller 16 can extract data related to the object and not the background from distance data generated in Step S42 (Step S43). A method for extracting the data related to the object and not the background can include: storing the above distance data formatted as frame data in a memory; comparing the distance data with the previous distance data in series; and regarding the different data from that of the background as the object. In this case, a detection error can be prevented by eliminating a very small data and/or large block data.

Then, the controller 16 can count the number of the photoelectric conversion chips having less charge than a predetermined threshold in at least one of the plurality of photoelectric conversion chips corresponding to the object extracted in Step S43 (Step S44). If the number exceeds a definite number (Yes in Step S45), the controller 16 can increase the light intensity of the light source 11 because the amount of the modulated light is determined as small by the controller 16 (Step S46). The processes from Step S40 to Step S46 can be repeated until the number becomes less than the definite number (No in Step S45).

As shown in FIG. 10 according to the circumstance, the controller 16 can count the number of the photoelectric conversion chips having more charge than a predetermined threshold in at least one of the plurality of photoelectric conversion chips corresponding to the object extracted in Step S43 (Step S47). If the number exceeds a definite number (Yes in Step S48), the controller 16 can decrease the light intensity of the light source 11 because the amount of the modulated light is determined as large by the controller 16 (Step S49). The processes from Step S40 to Step S49 can be repeated until the number becomes less than the definite number (No in Step S49).

In the exemplary operation 5 as described above, the controller 16 can extract data related to the object and not the background from distance data (Step S43) and can adjust the light intensity of the light source 11 (Yes in Step S45 and Step 46, and Yes in Step S48 and Step S49) in accordance with the number of the photoelectric conversion chips corresponding to the above-described extracted object (Step S44 and Step S47). Thus, because the light source 11 can maintain a favorable modulated light amount to the object, the distance measurement accuracy can further improve and therefore the distance data can be generated with higher accuracy.

[Exemplary Operation 6 of a Distance Measurement Apparatus]

When the distance measurement apparatus 1 is used when the distance to an object changes, for example, when the distance measurement apparatus 1 is used outdoors, when the distance measurement apparatus 1 is used in a movable body such as a vehicle and the like, etc., the distance measurement accuracy within the range of an area can increase by configuring the area where the distance measurement apparatus 1 should detect an object.

For instance, when the distance measurement apparatus 1 watches a forward situated obstacle/object by attaching the apparatus 1 to a front of a vehicle (or to a vehicle in general) and the obstacle is not positioned within a close range of the apparatus 1, the distance measurement apparatus 1 can measure the relatively far distance to the obstacle with high accuracy by increasing the light intensity of the light source 11. However, when the obstacle is positioned within a near range of the apparatus 1, the distance measurement accuracy may be affected because of the large amount of reflex light reflected from the obstacle.

Thus, the distance measurement accuracy can be increased by: determining a voluntary area where the distance measurement apparatus 1 should detect an object; generating distance data by the distance data generator 17; extracting data related to the obstacle/object within the range of the determined area; adjusting the light intensity of the light source 11; and emitting the favorable light intensity of modulated light towards the range of the determined area.

For instance, when the distance measurement apparatus 1 watches a forward positioned obstacle/object and the obstacle is not positioned immediately forward of the apparatus 1, the distance measurement apparatus 1 can increase the light intensity of the light source 11 in order to measure a far distance. When the obstacle is positioned forwards and the obstacle approaches within a range of a predetermined distance, the distance measurement apparatus 1 can adjust the light intensity of the light source 11 so that the light intensity becomes a favorable amount for the modulated light directed onto the obstacle within the range of the predetermined distance because the distance measurement apparatus 1 should regard the obstacle. In that case, the distance measurement apparatus 1 can operate based on flow charts shown FIGS. 11-12.

Figure 11:
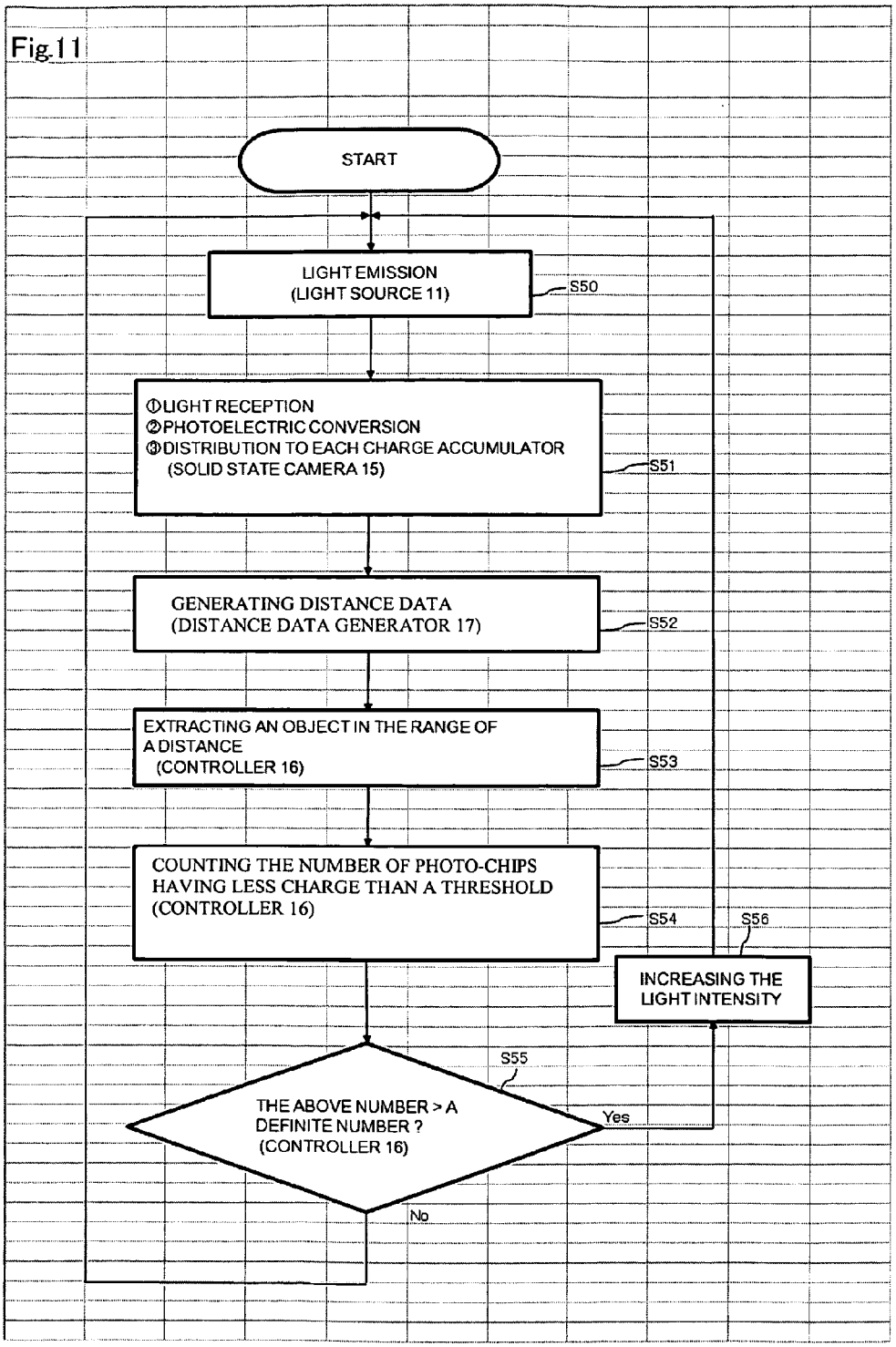
FIG. 11 is an explicative flow chart showing the exemplary operation 6 of the distance measurement apparatus of the first exemplary embodiment of the disclosed subject matter.
Figure 12:
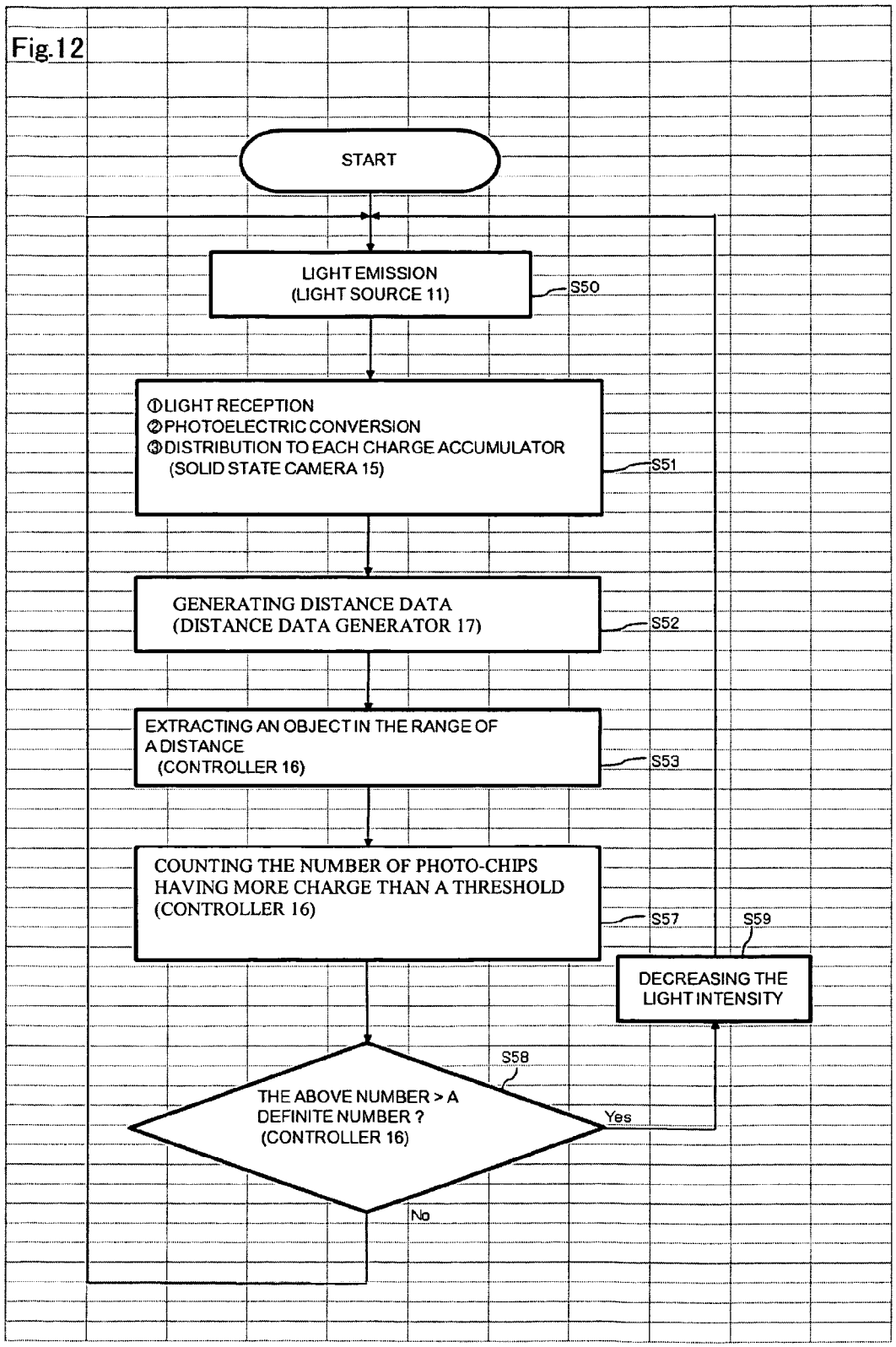
FIG. 12 is another explicative flow chart showing the exemplary operation 6 of the distance measurement apparatus of the first exemplary embodiment of the disclosed subject matter.

FIGS. 11-12 are explicative flow charts showing the exemplary operation 6 of the distance measurement apparatus 1 in accordance with a first exemplary embodiment of the disclosed subject matter. The following process of the above-described exemplary operation 6 can be mainly carried out by the controller 16 or by another controller, which can be provided in addition to the controller 16 in order to carry out other processes including the following process.

Initially, the light source 11 can emit the modulated light in accordance with the synchronizing signal output from the controller 16 towards a space in which a distance to an object should be measured Step 50 (Step S40). The solid state camera 15 can: receive the incoming light including the reflex light reflected from the object in the space where the modulated light is emitted from the light source 11; convert the incoming light into a plurality of charges using the plurality of photoelectric conversion chips; and distribute each charge to each of the plurality of charge accumulators in accordance with the synchronizing signal output from the controller 16 Step 51 (Step S41).

The distance data generator 17 can: carry out the predetermined calculation of the formula 1 according to each charge that is distributed; calculate the phase difference $\phi$ between the modulated light and the incoming light; calculate the distance of the object; and generate and transmit the distance data to a frame using a frame data format Step 52 (Step S42).

Then, the controller 16 can extract data related to the object that is positioned within the range of a predetermined voluntary distance from distance data generated in Step S52 (Step S42). A method for extracting the data related to the object positioned within the range of the predetermined voluntary distance can include: storing the above distance data in a memory; comparing the distance data with the previous distance data in series; and regarding the different data from that of the background within the range of the predetermined voluntary distance as the object. In this case, a detection error can be prevented by eliminating a very small data and/or large block data.

Then, the controller 16 can count the number of the photoelectric conversion chips which have a charge that is less than a predetermined threshold in at least one of the plurality of photoelectric conversion chips corresponding to the object extracted in Step S53 (Step S43). If the number exceeds a definite number (Yes in Step S58), the controller 16 can increase the light intensity of the light source 11 because the amount of the modulated light is determined as too small by the controller 16 in modified Step 59 (Step S46).

As shown in FIG. 12 according to the circumstance, the controller 16 can count the number of the photoelectric conversion chips having more charge than a predetermined threshold in a set of the plurality of photoelectric conversion chips which correspond to the object extracted in Step S53 (Step S43). If the number exceeds a definite number (Yes in Step S58), the controller 16 can decrease the light intensity of the modulated light of the light source 11 because the amount of the modulated light is determined as too large by the controller 16 (Step S59). The processes from Step S50 to Step S59 can be repeated until the number becomes less than (or equal to) the definite number (No in Step S45 or S59).

In the exemplary operation 6 as described above, the controller 16 can extract data related to the object positioned within the range to detect (Step S53) and can adjust the light intensity of the modulated light of the light source 11 (Yes in Step S45 and Step 46, and Yes in Step S58 and Step S59) in accordance with the number of the photoelectric conversion chips corresponding to the above-described extracted object (Step S44 and Step S57). Thus, because the light source 11 can maintain a favorable modulated light with respect to the object positioned within the range of the predetermined voluntary distance, the distance measurement accuracy can further improve and therefore the distance data can be generated with higher accuracy.

In this case, when photographing a broad space such when used outdoors on a vehicle for example, because objects in a broad range from a near distance of road to an infinite distance may be photographed, the measurement area can be narrowed down in the early stages of the process for generating distance data by eliminating an upper portion such as a sky and/or an under portion such as a road near the driven vehicle. In addition, the object positioned within the range of a voluntary distance from distance data can be regarded and the distance measurement apparatus 1 can prevent detection error by restricting a size and/or a shape of the detected object.

[Exemplary Operation 7 of a Distance Measurement Apparatus]

When a distance of an object cannot be measured with high accuracy using a particular amount of the modulated light (one kind of peak intensity of the modulated light) emitted from the light source 11, for instance, when the distance measurement area includes a plurality of ranges, when a plurality of objects are different from the respective distances and/or the respective reflectivities, etc., each distance to the plurality of objects can be measured with high accuracy by changing the light intensity of the modulated light in accordance with each frame.

For instance, when the distance measurement area is between 0 meters and 30 meters, a distance associated with each of the objects may not be measured with high accuracy using one modulated light having a light intensity emitted from the light source 11. However, when two modulated lights having respective different light intensities are respectively used between 0 meters and 15 meters and between 15 meters and 30 meters, a distance measurement for each of the objects may be measured with higher accuracy.

In this case, the distance from the apparatus 1 for each of the objects positioned within the range of a wide area can be measured with high accuracy by changing the modulated light to the respective favorable light intensities at locations between 0 meters and 15 meters and between 15 meters and 30 meters for every frame. The above-described "one frame" means a time (very short term) for generating one distance data including both distance data between 0 meters and 15 meters and between 15 meters and 30 meters and which can be generated using each of two frame terms. In the above-described case, the distance measurement apparatus 1 can operate based on the flow charts shown FIG. 13.

Figure 13:
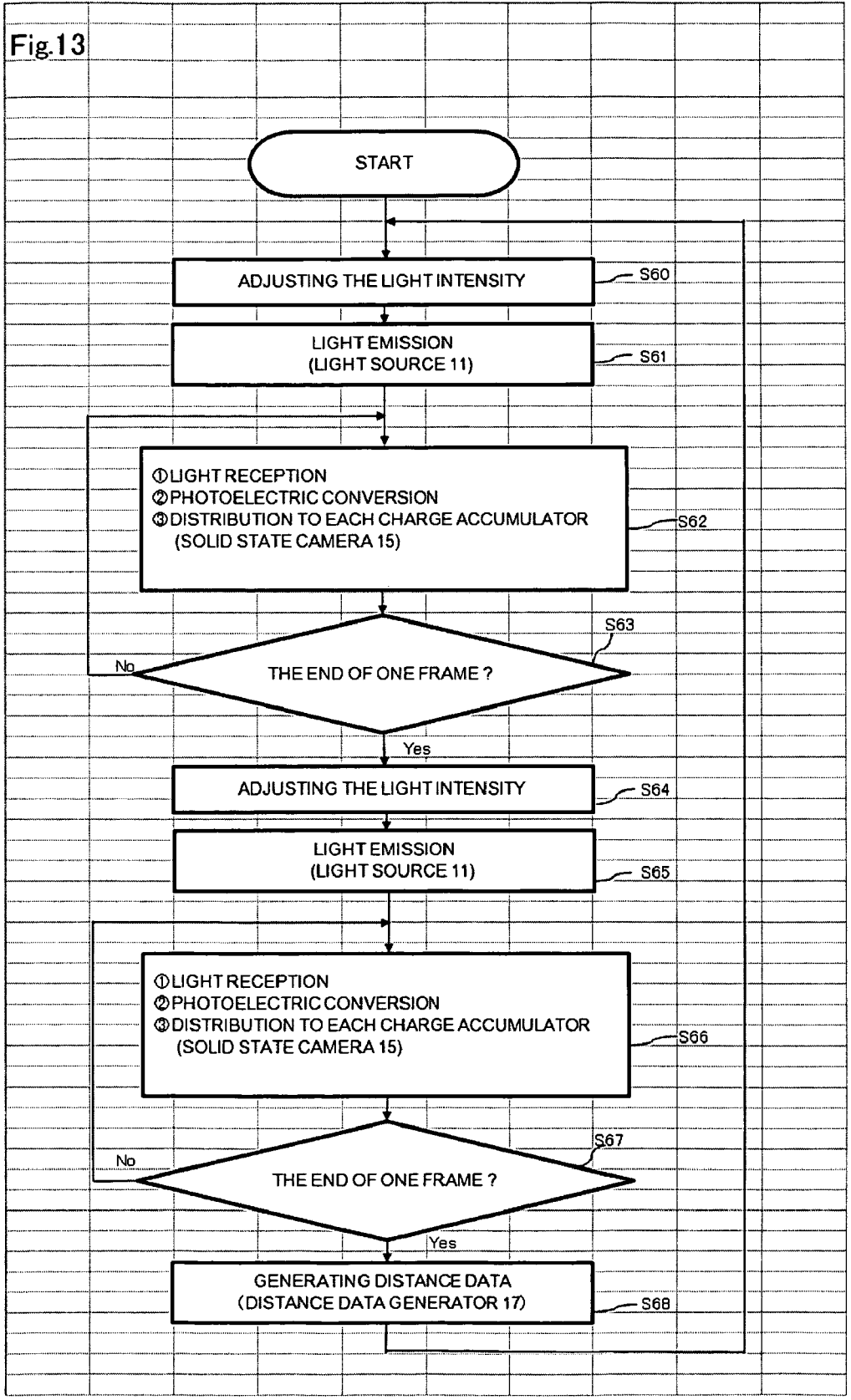
FIG. 13 is an explicative flow chart showing the exemplary operation 7 of the distance measurement apparatus of the first exemplary embodiment of the disclosed subject matter.

FIG. 13 is an explicative flow chart showing the exemplary operation 7 of the distance measurement apparatus 1 in accordance with a first exemplary embodiment of the disclosed subject matter. The following process of the above-described exemplary operation 7 can mainly be carried out by the controller 16 or by another controller, which can be provided in addition to the controller 16 in order to carry out other processes including the following process.

Initially, the light source 11 can emit the modulated light having a favorable light intensity to between 0 meters and 15 meters in accordance with the synchronizing signal output from the controller 16 towards a space in which a distance to an object should be measured (Steps S60 and S61). The solid state camera 15 can: receive the incoming light including the reflex light reflected from the object in the space where the modulated light is emitted from the light source 11; convert the incoming light into a plurality of charges using the plurality of photoelectric conversion chips; calculate the distance to the object; and distribute each charge to each of the plurality of charges accumulators in accordance with the synchronizing signal output from the controller 16 (Step S62).

After one frame including the immediately above-described processes (Yes in Step S63), the light source 11 can emit the modulated light having a favorable light intensity to a location between 15 meters and 30 meters in accordance with the synchronizing signal output from the controller 16 towards a space in which a distance to an object should be measured (Steps S65 and S66). The solid state camera 15 can: receive the incoming light including the reflex light reflected from the object in the space where the modulated light is emitted from the light source 11; convert the incoming light into a plurality of charges using the plurality of photoelectric conversion chips; and distribute each charge to each of the plurality of charges accumulators in accordance with the synchronizing signal output from the controller 16 (Step S66).

After another one frame of the above-described processes (Yes in Step S67), the distance data generator 17 can: carry out the predetermined calculation of the formula 1 according to each charge distributed in Step 62; calculate the phase difference ϕ between the modulated light and the incoming light; calculate the distance to the object; and generate and transmit the distance data of the object positioned in the range of between 0 meters and 15 meters. Similarly, the distance data generator 17 can carry out the predetermined calculation of the formula 1 according to each charge distributed in Step 66; calculate the distance to the object; and can generate the distance data with respect to the object positioned in the range of between 15 meters and 30 meters (Step S68). After that, processes from Step 60 to Step 68 can be repeated.

In the exemplary operation 7 as described above, because the distance measurement apparatus 1 can change the modulated light to respective favorable light intensities for distances of between 0 meters and 15 meters and between 15 meters and 30 meters for every frame (Steps S60 and S64), the distance measurement apparatus 1 can also measure a plurality of objects positioned in the wide range along a long distance with high accuracy. Thus, the distance measurement accuracy can be further improved and the distance data can be generated with higher accuracy even if a plurality of objects positioned within a broad range are measured.

In addition, in the above-described exemplary operation, two kinds of distance areas are divided. However, the distance measurement apparatus 1 cannot be limited to only these two kinds of distance areas, and can be divided in more than two kinds of distance areas. Furthermore, the distance measurement apparatus 1 according to the above-described exemplary operation 7 can be divided in accordance with each of the objects having a plurality of reflectivities and/or in accordance with each of the objects having a plurality of distance ranges and can adjust to each of the light intensities of the modulated lights based on the divided objects.

According to the distance measurement apparatus 1 of the first exemplary embodiment described above, the light intensity of the modulated light emitted from the light source 11 can be changed to a favorable intensity in accordance with the measurement circumstance. Thus, the distance measurement apparatus 1 can measure the distance of an object with high accuracy under various circumstances and can generate distance data along with the image data using a frame data format. In addition, the distance measurement apparatus 1 can be prevented from using unnecessary power by controlling the favorable light intensity of the modulated light emitted from the light source 11. Furthermore, because the above-described adjustment of the light intensity can be carried out by a typical controller 16 for controlling the image data of the solid state camera 15, the distance measurement apparatus 1 can be configured with a simple structure and at a low cost.

Second Exemplary Embodiments

A second example of a distance measurement apparatus made in accordance with principles of the disclosed subject matter will now be described in detail with reference to FIGS. 14-15.

[Configuration of a Distance Measurement Apparatus]

When measuring a forward distance by the distance measurement apparatus 1 attached to a vehicle, for example attached to a front of the vehicle, the items in the upper portion of the image data are often relatively far away (such as sky, etc.), and items in the lower portion are often positioned relatively near the apparatus 1, such as roadway, a part of the driven vehicle, etc. Thus, the distance measurement apparatus 1 can be configured to change the light intensity of the modulated light emitted from the light source 11 based on each of the various locations of the image data.

The distance measurement apparatus 1 in accordance with the second exemplary embodiment of the disclosed subject matter can change the light intensity of the light source 11 based on each different location of the image data photographed by the solid state camera 15. Therefore, the distance measurement apparatus 1 can be basically the same configuration as that of the distance measurement apparatus 1 of the first exemplary embodiment. Examples of differences between the exemplary embodiments are described as follows.

Figure 14:
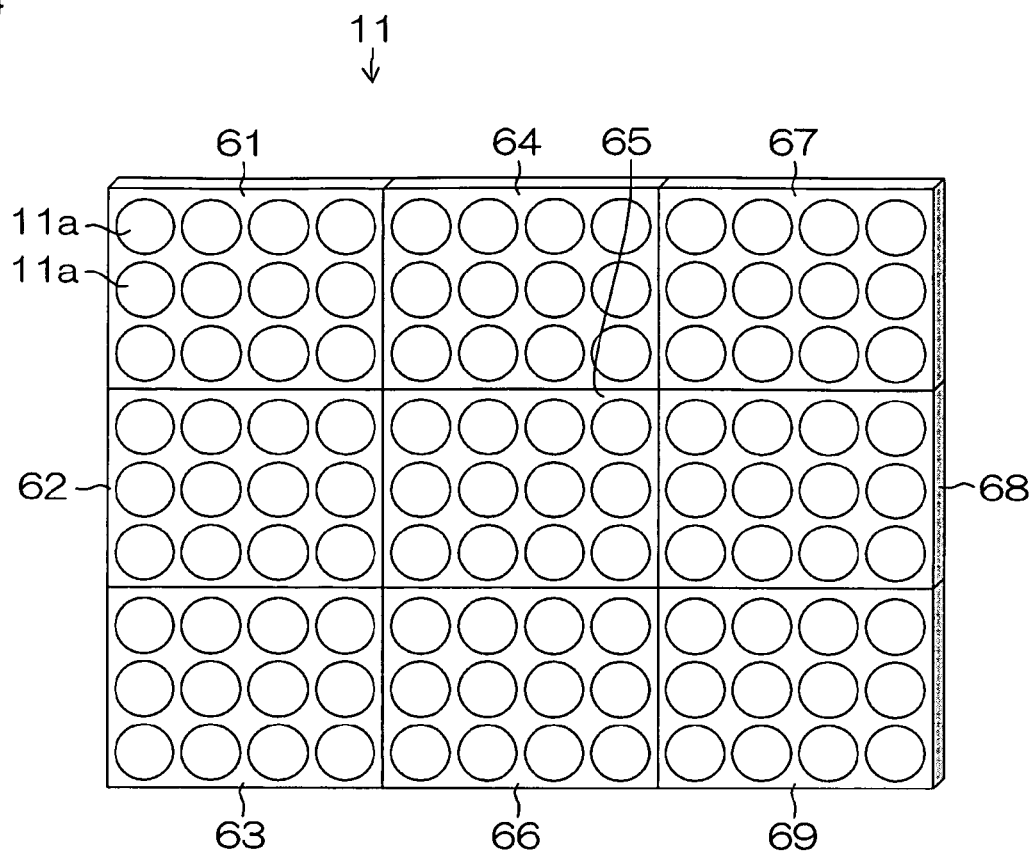
FIG. 14 is a front view showing a light source of a second embodiment of a distance measurement apparatus made in accordance with principles of the disclosed subject matter.

FIG. 14 is a front view showing a light source of a distance measurement apparatus 11 in accordance with a second exemplary embodiment of the disclosed subject matter. A first point of difference between embodiments can include that the light source 11 can be configured with a plurality of light-emitting devices 11a such as an LED and the like that can emit respective modulated light rays towards a space in which the distance measurement apparatus 1 should measure objects as show in FIG. 14. For example, the light source 11 shown in FIG. 14 can include one hundred eight pieces of light-emitting device 11a, which can be divided into nine emitting areas 61-69.

A second point of difference between embodiments can include that each emitting area of the light source 11 can be configured to adjust the light intensity of a plurality of light-emitting devices 11a in each emitting area 61-69, respectively. For example, the light source 11 shown in FIG. 14 can include nine emitting areas from area 61 to area 69. The light intensity adjustment of each emitting area of the light source 11 can mainly be controlled by the controller 16 in a similar fashion as described above with respect to the first exemplary embodiment and can also be controlled by another controller provided in addition to the controller 16.

A third point of difference between embodiments can include that the plurality of photoelectric conversion chips in the solid state camera 15 can be configured to be divided into separate detecting areas corresponding to each emitting area of the light source 11. For example, the plurality of photoelectric conversion chips can be divided into nine detecting areas corresponding to the nine areas 61-69 of the light source 11 shown in FIG. 14. A fourth point can include that each of the above nine detecting areas can be used to carry out the exemplary operations 1-7 described above with respect to the first exemplary embodiment along with each of emitting areas 61-69 corresponding thereto, respectively.

Figure 15:
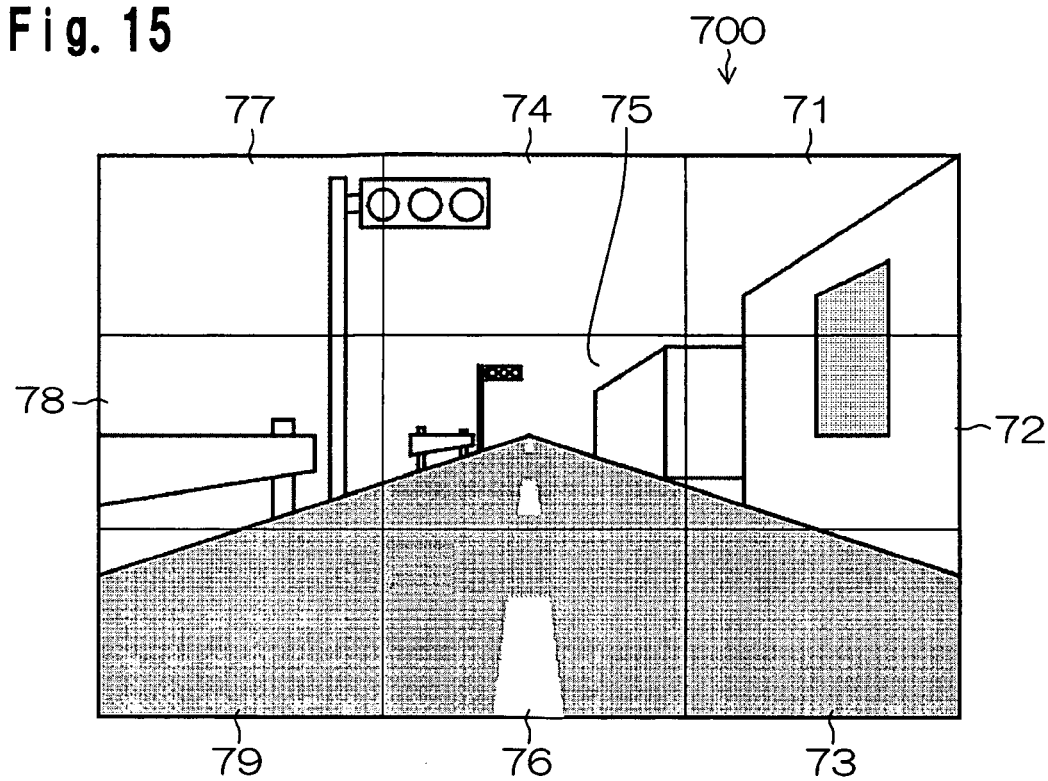
FIG. 15 is an exemplary image data photographed by a distance measurement apparatus in accordance with the second exemplary embodiment of the disclosed subject matter when attached to a front of a vehicle.

More specifically, FIG. 15 is an exemplary image data photographed by a distance measurement apparatus 1 in accordance with the second exemplary embodiment of the disclosed subject matter when attached to a front of a vehicle. FIG. 15 shows whole image data 700 and areas 71-79 can correspond to the above-described nine areas corresponding to each of emitting areas 61-69 of the light source 11. For instance, a reflex light reflected from an object by a modulated light emitted from emitting area 61 can be received on detecting area 71 of the plurality of photoelectric conversion chips and similarly, each reflex light reflected by other emitting areas 62-69 can be received on each of the corresponding other detecting areas 72-79, respectively.

The above-described exemplary operations 1-7 can be carried out on respective detecting areas 71-79 independently and in conjunction with operation of each emitting area 61-69 of the light source 11, respectively. In general, because an upper portion of the plurality of photoelectric conversion chips, such as detecting areas 71, 74 and 77, includes items that are positioned relatively far away from the apparatus 1 (such as sky and the like), an upper portion of the light source 11 such as emitting areas 61, 64 and 67 may include a large amount of modulated light.

On the other hand, because a lower portion of the plurality of photoelectric conversion chips such as detecting areas 73, 76 and 79 includes items that are positioned relatively near (such as a road and the like), a lower portion of the light source 11 such as emitting areas 63, 66 and 69 may provide a small amount of modulated light.

In the second exemplary embodiment, detecting areas 73, 76, and 79 shown in FIG. 15 can receive the incoming light including a large amount of reflex light reflected from the road because the detecting area 73, 76, and 79 photographs items that are located at a distance close to the distance measurement apparatus 1. Thus, for example, when each detecting area of the plurality of photoelectric conversion chips is operated in accordance with the process shown in FIG. 6, the respective light intensities of emitting areas 63, 66 and 69 of the light source 11 that are adjusted based on each of the detecting areas 73, 76 and 79 can decrease.

Meanwhile, because detecting areas 71, 74, and 77 shown in FIG. 15 photographs items that are located at a far distance from the distance measurement apparatus 1, each light intensity of emitting areas 61, 64 and 67 of the light source 11 corresponding to the detecting areas 71, 74 and 77 increases. For instance, when the process shown in FIG. 4 is carried out using each detecting area of the plurality of photoelectric conversion chips, the respective light intensities of the corresponding emitting areas 61, 64 and 67 of the light source 11 can be adjusted based on each of the detecting areas 71, 74 and 77 and can increase. In addition, when photographing a signal light as shown in FIG. 15, the emitting area 64 of the light source 11 corresponding to the detecting area 74 which photographs the signal light can be controlled to adjust the light intensity thereof in accordance with the processes shown in FIG. 4 and/or FIG. 6.

In the second exemplary embodiment, the nine areas are described with reference to the divided area of both the light source 11 and the plurality of photoelectric conversion chips. However, the distance measurement apparatus 1 cannot be limited to the nine areas and the number of divided areas can be greater or lesser depending on a particular application. In addition, the number of emitting areas of the light source 11 can be different from that of the plurality of detecting areas even if certain of the respective emitting areas of the light source 11 corresponds to the respective detecting areas of the plurality of photoelectric conversion chips, respectively.

According to the distance measurement apparatus 1 of the above-described second exemplary embodiment, the light intensity of the modulated light emitted from each of emitting areas of the light source 11 can be changed to emit a favorable intensity in accordance with each of the plurality of detecting areas using controller 16. Thus, the distance measurement apparatus 1 can measure the distance of an object with higher accuracy under various circumstances and can generate accurate distance data along with the image data using a frame data format at a low cost. In addition, the distance measurement apparatus 1 can be operated such that it is prevented from using unnecessary power consumption by controlling the respective favorable light intensities of the modulated lights according to each emitting area.

While there has been described what are at present considered to be exemplary embodiments of the disclosed subject matter, it will be understood that various modifications may be made thereto, and it is intended that the appended claims cover such modifications as fall within the true spirit and scope of the invention. It should be understood that the term "step" as it appears throughout the specification and claims is not intended to require a chronological action or sequence of process features. All conventional art references described above are herein incorporated in their entirety by reference.

What is claimed is:

1. A method for measuring a distance from a measurement apparatus to an object, comprising:

emitting a modulated light having a predetermined frequency and period towards a space in which measurement of the distance from the measurement apparatus to the object is desired;

receiving an incoming light including a reflex light reflected from the object;

converting the incoming light into a plurality of charges during each of four terms in one period of the modulated light;

calculating each phase difference between the modulated light and the incoming light based on each of the plurality of charges during and corresponding to each of the four terms in the one period of the modulated light;

calculating a distance from the measuring apparatus to the object using information related to the plurality of charges and each phase difference; and adjusting a light intensity of the modulated light in accordance with information related to the plurality of charges converted from the incoming light.

2. The method for measuring a distance according to claim 1, wherein adjusting the light intensity of the modulated light includes adjusting the light intensity when a number of charges are less than a predetermined threshold in the plurality of charges converted from the incoming light during at least one of the four terms in the one period of the modulated light and/or when a number of charges are greater than another predetermined threshold in the plurality of charges converted from the incoming light during at least one of the four terms in the one period of the modulated light.

3. The method for measuring a distance according to claim 1, wherein adjusting the light intensity of the modulated light includes adjusting the light intensity when an amplitude of a number of charges in the plurality of charges converted from the incoming light is out of a range of at least one predetermined amplitude during at least the one period of the modulated light.

4. The method for measuring a distance according to claim 2, wherein adjusting the light intensity of the modulated light includes adjusting the light intensity when an amplitude of a number of charges in the plurality of charges converted from the incoming light is out of a range of at least one predetermined amplitude during at least the one period of the modulated light.

5. The method for measuring a distance according to claim 1, further comprising:
at least one of calculating a mean value of amplitudes of the modulated light and calculating a standard deviation of amplitudes of the modulated light,
wherein adjusting the light intensity includes adjusting the light intensity of the modulated light to fall within at least one of the mean value and the standard deviation of amplitudes when the plurality of charges converted from the incoming light during at least the one period of the modulated light is within a range of a definite value.

6. The method for measuring a distance according to claim 2, further comprising:
at least one of calculating a mean value of amplitudes of the modulated light and calculating a standard deviation of amplitudes of the modulated light,
wherein adjusting the light intensity includes adjusting the light intensity of the modulated light to fall within at least one of the mean value and the standard deviation of amplitudes when the plurality of charges converted from the incoming light during at least the one period of the modulated light is within a range of a definite value.

7. The method for measuring a distance according to claim 3, further comprising:
at least one of calculating a mean value of amplitudes of the modulated light and calculating a standard deviation of amplitudes of the modulated light,
wherein adjusting the light intensity includes adjusting the light intensity of the modulated light to fall within at least one of the mean value and the standard deviation of amplitudes when the plurality of charges converted from the incoming light during at least the one period of the modulated light is within a range of a definite value.

8. The method for measuring a distance according to claim 4, further comprising:
at least one of calculating a mean value of amplitudes of the modulated light and calculating a standard deviation of amplitudes of the modulated light,
wherein adjusting the light intensity includes adjusting the light intensity of the modulated light to fall within at least one of the mean value and the standard deviation of amplitudes when the plurality of charges converted from the incoming light during at least the one period of the modulated light is within a range of a definite value.

9. The method for measuring a distance according to claim 2, further comprising:
extracting a plurality of charges corresponding to the object from each of the plurality of charges used for calculating the distance to the object, wherein adjusting the light intensity includes adjusting the light intensity of the modulated light when a number of charges are less than a predetermined threshold in the plurality of charges corresponding to the object extracted from each of the plurality of charges used for calculating the distance to the object and/or when a number of charges are more than another predetermined threshold in the plurality of charges corresponding to the object extracted from each of the plurality of charges used for calculating the distance to the object.

10. The method for measuring a distance according to claim 3, further comprising:
extracting a plurality of charges corresponding to the object from each of the plurality of charges used for calculating the distance to the object, wherein adjusting the light intensity includes adjusting the light intensity of the modulated light when a number of charges are less than a predetermined threshold in the plurality of charges corresponding to the object extracted from each of the plurality of charges used for calculating the distance to the object and/or when a number of charges are more than another predetermined threshold in the plurality of charges corresponding to the object extracted from each of the plurality of charges used for calculating the distance to the object.

11. The method for measuring a distance according to claim 4, further comprising:
extracting a plurality of charges corresponding to the object from each of the plurality of charges used for calculating the distance to the object, wherein adjusting the light intensity includes adjusting the light intensity of the modulated light when a number of charges are less than a predetermined threshold in the plurality of charges corresponding to the object extracted from each of the plurality of charges used for calculating the distance to the object and/or when a number of charges are more than another predetermined threshold in the plurality of charges corresponding to the object extracted from each of the plurality of charges used for calculating the distance to the object.

12. The method for measuring a distance according to claim 9, wherein the plurality of charges corresponding to the object extracted from each of the plurality of charges used for calculating the distance to the object corresponds to an object positioned within a range of at least one predetermined distance from the measurement apparatus.

13. The method for measuring a distance according to claim 10, wherein the plurality of charges corresponding to the object extracted from each of the plurality of charges used for calculating the distance to the object corresponds to an object positioned within a range of at least one predetermined distance from the measurement apparatus.

14. The method for measuring a distance according to claim 11, wherein the plurality of charges corresponding to the object extracted from each of the plurality of charges used for calculating the distance to the object corresponds to an object positioned within a range of at least one predetermined distance from the measurement apparatus.

15. A method for measuring a distance from a measurement apparatus to an object, comprising:
emitting a plurality of modulated light rays each having a predetermined frequency and period, the light rays being divided into a plurality of emitting areas and directed towards a space in which a measurement of the distance from the measurement apparatus to the object is desired;
receiving incoming light rays including reflex light rays transmitted from the plurality of emitting areas and reflected from the object and onto each of a plurality of detecting areas of the measurement apparatus;
converting each of the incoming light rays into a plurality of charges during each of four terms in one period of the plurality of modulated light rays;
calculating a phase difference between the plurality of modulated light rays and each corresponding incoming light ray based on each of the plurality of charges converted during each of the four terms in the one period of the plurality of modulated light rays;
calculating a distance from the measuring apparatus to the object using information related to the plurality of charges and each phase difference; and
adjusting a light intensity of the plurality of modulated light rays in each of the plurality of emitting areas in accordance with information related to each of the plurality of charges converted from each of the incoming light rays.

16. The method for measuring a distance according to claim 15, wherein adjusting each light intensity of the plurality of modulated light rays in each of the plurality of emitting areas includes adjusting the light intensity when a number of charges are less than a predetermined threshold for each of the plurality of charges converted from each incoming light ray during at least one of the four terms in the one period of the plurality of modulated light rays and/or when a number of charges are greater than another predetermined threshold for each of the plurality of charges converted from each incoming light ray during at least one of the four terms in the one period of the plurality of modulated light rays.

17. The method for measuring a distance according to claim 15, wherein adjusting each light intensity of the plurality of modulated light rays in each of the plurality of emitting areas includes adjusting the light intensity when an amplitude associated with a number of charges is out of a range of at least one predetermined amplitude, the number of charges taken from the plurality of charges converted from each incoming light ray during at least the one period of the plurality of modulated light rays.

18. The method for measuring a distance according to claim 16, wherein adjusting each light intensity of the plurality of modulated light rays in each of the plurality of emitting areas includes adjusting the light intensity when an amplitude associated with a number of charges is out of a range of at least one predetermined amplitude, the number of charges taken from the plurality of charges converted from each incoming light ray during at least the one period of the plurality of modulated light rays.

19. The method for measuring a distance according to claim 15, further comprising:
at least one of calculating a mean value of amplitudes of the modulated light rays and calculating a standard deviation of amplitudes of the modulated light rays, wherein adjusting light intensity includes adjusting light intensity of the plurality of modulated light rays in each of the plurality of emitting areas so as to fall within at least one of the mean value and the standard deviation of amplitudes when each of the plurality of charges converted from each incoming light ray during at least the one period of the plurality of modulated light rays is within a range of a definite value.

20. The method for measuring a distance according to claim 16, further comprising:
at least one of calculating a mean value of amplitudes of the modulated light rays and calculating a standard deviation of amplitudes of the modulated light rays, wherein adjusting light intensity includes adjusting light intensity of the plurality of modulated light rays in each of the plurality of emitting areas so as to fall within at least one of the mean value and the standard deviation of amplitudes when each of the plurality of charges converted from each incoming light ray during at least the one period of the plurality of modulated light rays is within a range of a definite value.

21. The method for measuring a distance according to claim 17, further comprising:
at least one of calculating a mean value of amplitudes of the modulated light rays and calculating a standard deviation of amplitudes of the modulated light rays, wherein adjusting light intensity includes adjusting light intensity of the plurality of modulated light rays in each of the plurality of emitting areas so as to fall within at least one of the mean value and the standard deviation of amplitudes when each of the plurality of charges converted from each incoming light ray during at least the one period of the plurality of modulated light rays is within a range of a definite value.

22. The method for measuring a distance according to claim 18, further comprising:
at least one of calculating a mean value of amplitudes of the modulated light rays and calculating a standard deviation of amplitudes of the modulated light rays, wherein adjusting light intensity includes adjusting light intensity of the plurality of modulated light rays in each of the plurality of emitting areas so as to fall within at least one of the mean value and the standard deviation of amplitudes when each of the plurality of charges converted from each incoming light ray during at least the one period of the plurality of modulated light rays is within a range of a definite value.

23. The method for measuring a distance according to claim 16, further comprising:
extracting each of a plurality of charges corresponding to the object from each of the plurality of charges used for calculating each distance from each of the plurality of emitting areas to the object, wherein adjusting the light intensity of the plurality of modulated light rays includes adjusting the light intensity in each of the plurality of emitting areas when a number of charges is less than a predetermined threshold in each of the plurality of charges corresponding to the object extracted from each of the plurality of charges used for calculating each distance from each of the plurality of emitting areas to the object and/or when a number of charges is more than another predetermined threshold in each of the plurality of charges corresponding to the object extracted from each of the plurality of charges used for calculating each distance from each of the plurality of emitting areas to the object.

24. The method for measuring a distance according to claim 17, further comprising:
extracting each of a plurality of charges corresponding to the object from each of the plurality of charges used for calculating each distance from each of the plurality of emitting areas to the object, wherein adjusting the light intensity of the plurality of modulated light rays includes adjusting the light intensity in each of the plurality of emitting areas when a number of charges is less than a predetermined threshold in each of the plurality of charges corresponding to the object extracted from each of the plurality of charges used for calculating each distance from each of the plurality of emitting areas to the object and/or when a number of charges is more than another predetermined threshold in each of the plurality of charges corresponding to the object extracted from each of the plurality of charges used for calculating each distance from each of the plurality of emitting areas to the object.

25. The method for measuring a distance according to claim 18, further comprising:
extracting each of a plurality of charges corresponding to the object from each of the plurality of charges used for calculating each distance from each of the plurality of emitting areas to the object, wherein adjusting the light intensity of the plurality of modulated light rays includes adjusting the light intensity in each of the plurality of emitting areas when a number of charges is less than a predetermined threshold in each of the plurality of charges corresponding to the object extracted from each of the plurality of charges used for calculating each distance from each of the plurality of emitting areas to the object and/or when a number of charges is more than another predetermined threshold in each of the plurality of charges corresponding to the object extracted from each of the plurality of charges used for calculating each distance from each of the plurality of emitting areas to the object.

26. The method for measuring a distance according to claim 23, wherein each of the plurality of charges corresponding to the object extracted from each of the plurality of charges used for calculating each distance from each of the plurality of emitting areas to the object corresponds to an object positioned within a range of at least one predetermined distance from the measurement apparatus to the object.

27. The method for measuring a distance according to claim 24, wherein each of the plurality of charges corresponding to the object extracted from each of the plurality of charges used for calculating each distance from each of the plurality of emitting areas to the object corresponds to an object positioned within a range of at least one predetermined distance from the measurement apparatus to the object.

28. The method for measuring a distance according to claim 25, wherein each of the plurality of charges corresponding to the object extracted from each of the plurality of charges used for calculating each distance from each of the plurality of emitting areas to the object corresponds to an object positioned within a range of at least one predetermined distance from the measurement apparatus to the object.

29. A distance measurement apparatus configured to use the method for measuring a distance according to claim 1, comprising:
   a light source configured to emit the modulated light having the predetermined frequency towards the space in which the measurement of the distance to the object is desired;
   a solid state camera configured to receive the incoming light including the reflex light reflected from the object and to convert the incoming light into the plurality of charges during each of the four terms in the one period of the modulated light;
   a distance data generator configured to calculate each phase difference between the modulated light and the incoming light based on each of the plurality of charges converted during each of the four terms in the one period of the modulated light and to calculate the distance to the object corresponding to each of the plurality of charges in accordance with each phase difference; and
   a controller configured to synchronize both the light source and the solid state camera and to adjust the light intensity of the modulated light emitted from the light source.

30. The distance measurement apparatus according to claim 29, wherein the controller is configured to count at least one of,
   the number of charges that are less than a predetermined threshold in the plurality of charges converted from the incoming light during at least one of the four terms in the one period of the modulated light, and
   the number of charges that are more than another predetermined threshold in the plurality of charges converted from the incoming light during at least one of the four terms in the one period of the modulated light,
   the controller further configured to count a number of amplitudes that are out of the range of at least one predetermined amplitude in the plurality of charges converted from the incoming light during at least the one period of the modulated light; and
   the controller further configured to calculate at least one of the mean value and the standard deviation of amplitudes calculated in accordance with the plurality of charges converted from the incoming light during at least the one period of the modulated light.

31. The distance measurement apparatus according to claim 29, wherein the controller is configured to:
   extract a plurality of charges corresponding to the object from each of the plurality of charges used for calculating the distance to the object; and
   calculate a number of amplitudes out of a range of at least one predetermined amplitude in the plurality of charges corresponding to the object extracted from each of the plurality of charges used for calculating the distance to the object.

32. The distance measurement apparatus according to claim 29, wherein the controller is configured to extract a plurality of charges corresponding to the object from each of the plurality of charges used for calculating the distance to the object when the object is positioned within a range of at least one predetermined distance between the measurement apparatus and the object.

33. A distance measurement apparatus configured to use the method for measuring distance according to claim 15, further comprising:
   a plurality of light sources configured to be divided into a plurality of emitting areas and to emit a plurality of the modulated light rays having the predetermined frequency towards the space in which a distance from the measurement apparatus to the object is desired;
   a solid state camera configured to include a plurality of detecting areas, to receive each incoming light ray including each reflex light from the plurality of emitting areas reflected from the object and onto each of the plurality of detecting areas of the measurement apparatus and to convert each incoming light ray into each of the plurality of charges during each of the four terms in the one period of the plurality of modulated light rays;
   a distance data generator configured to calculate each phase difference between the plurality of modulated light rays and each corresponding incoming light ray based on each of the plurality of charges converted during each of the four terms in the one period of the plurality of modulated lights and to calculate each distance from each of the plurality of emitting areas to the object using information associated with the plurality of charges and each phase difference; and
   a controller configured to synchronize both the plurality of light sources in each of the plurality of emitting areas and the solid state camera and to adjust each light intensity of the plurality of modulated light rays in each of the plurality of emitting areas.

34. The distance measurement apparatus according to claim 33, wherein the controller is configured to:
   count at least one of
      a number of charges that are less than a predetermined threshold in each of the plurality of charges converted from each incoming light ray during at least one of the four terms in the one period of the plurality of modulated light rays and
      a number of charges that are more than another predetermined threshold in each of the plurality of charges converted from each incoming light ray during at least one of the four terms in the one period of the plurality of modulated light rays;
   the controller also configured to count a number of amplitudes of charges out of a range of at least one predetermined amplitude in each of the plurality of charges converted from each incoming light during at least the one period of the plurality of modulated lights; and the controller configured to calculate at least one of a mean value and a standard deviation of amplitudes in accordance with each of the plurality of charges converted from each incoming light ray during at least the one period of the plurality of modulated lights.

35. The distance measurement apparatus according to claim 33, wherein the controller is configured to:

extract each of a plurality of charges corresponding to the object from each of the plurality of charges used for calculating each distance; and calculate at least one of a number of charges that are less than a predetermined threshold in each of the plurality of charges corresponding to the object extracted from each of the plurality of charges used for calculating each distance, and a number of charges that are more than another predetermined threshold in each of the plurality of charges corresponding to the object extracted from each of the plurality of charges used for calculating each distance.

36. The distance measurement apparatus according to claim 34, wherein the controller is configured to extract each of the plurality of charges corresponding to the object from each of the plurality of charges used for calculating each distance when the object is positioned within a range of at least a predetermined distance from the measurement apparatus.

* * * * *